(12) United States Patent
Ishiguro

(10) Patent No.: US 7,792,364 B2
(45) Date of Patent: Sep. 7, 2010

(54) IMAGE PROCESSING APPARATUS AND IMAGE PROCESSING PROGRAM PRODUCT FOR DISCRIMINATING DOT REGION IN IMAGE

(75) Inventor: Kazuhiro Ishiguro, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1594 days.

(21) Appl. No.: 10/730,122

(22) Filed: Dec. 9, 2003

(65) Prior Publication Data
US 2005/0036687 A1 Feb. 17, 2005

(30) Foreign Application Priority Data
Aug. 12, 2003 (JP) ............... 2003-292434

(51) Int. Cl.
*G06K 9/46* (2006.01)
(52) U.S. Cl. ............ 382/194; 382/195; 382/199; 382/203; 382/218
(58) Field of Classification Search ........ 382/194, 382/195, 203, 218
See application file for complete search history.

(56) References Cited

U.S. PATENT DOCUMENTS

| 6,055,334 A * | 4/2000 | Kato ............ 382/190 |
| 6,181,437 B1 * | 1/2001 | Sawada ............ 358/1.9 |
| 7,064,865 B2 * | 6/2006 | Ishikawa ............ 358/1.9 |
| 2002/0081031 A1 * | 6/2002 | Suzuki ............ 382/194 |
| 2002/0126315 A1 | 9/2002 | Nabeshima |

FOREIGN PATENT DOCUMENTS

| JP | 11-225228 | 8/1999 |
| JP | 2002-24837 | 1/2002 |
| JP | 2002-271616 A | 9/2002 |

OTHER PUBLICATIONS

Office Action also copy in English Translation issued on Apr. 18, 2006 by the Japanese Patent Office, and translation thereof.

* cited by examiner

Primary Examiner—Matthew C Bella
Assistant Examiner—Mike Rahmjoo
(74) Attorney, Agent, or Firm—Buchanan Ingersoll & Rooney PC

(57) ABSTRACT

To accurately discriminate a dot region within an image, the image processing apparatus includes first through fourth isolated dot discriminating portions each judging, for each of a plurality of pixels included in the image, whether the pixel corresponds to a center pixel of an isolated dot, an isolated dot size determining portion detecting an isolated dot size, a dot region discriminating portion judging whether a target pixel is included in a dot region based on a position of the pixel judged as being the center pixel of the isolated dot, and a dot region determining portion determining the dot region based on a position of the target pixel judged as being included in the dot region and the detected isolated dot size.

13 Claims, 18 Drawing Sheets

F I G. 6
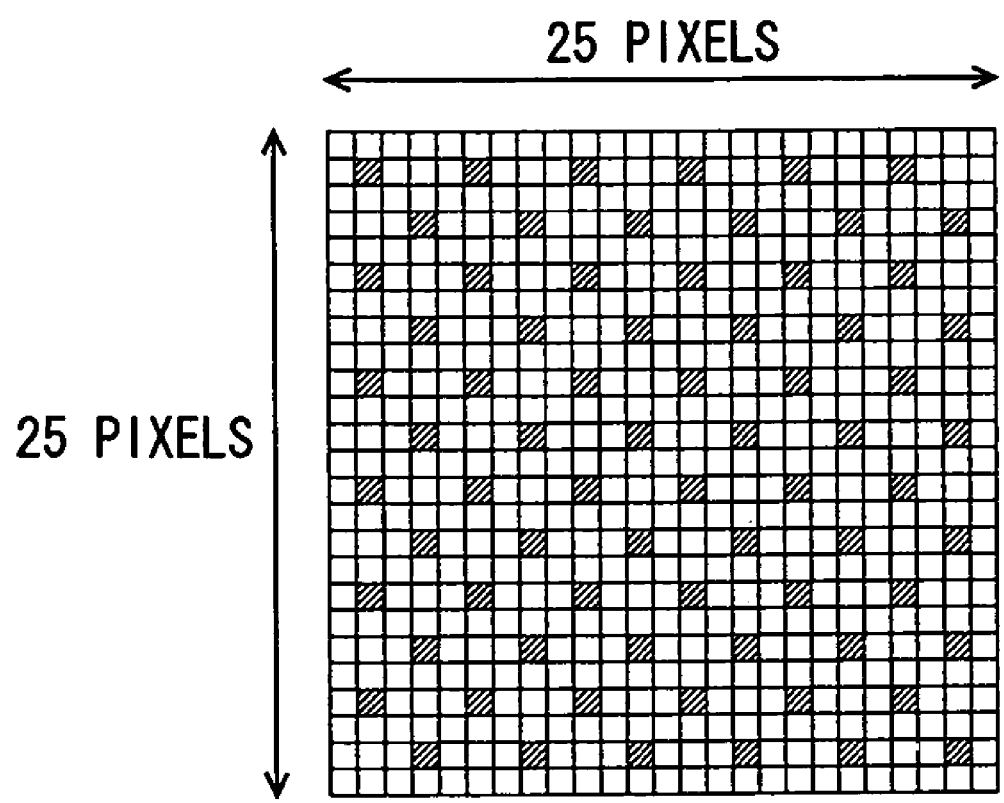

F I G. 7 A
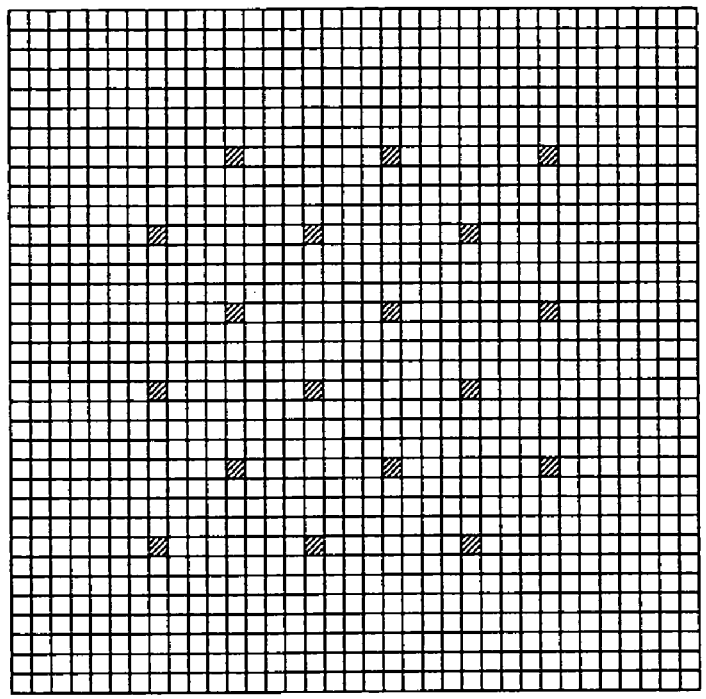
F I G. 7 B
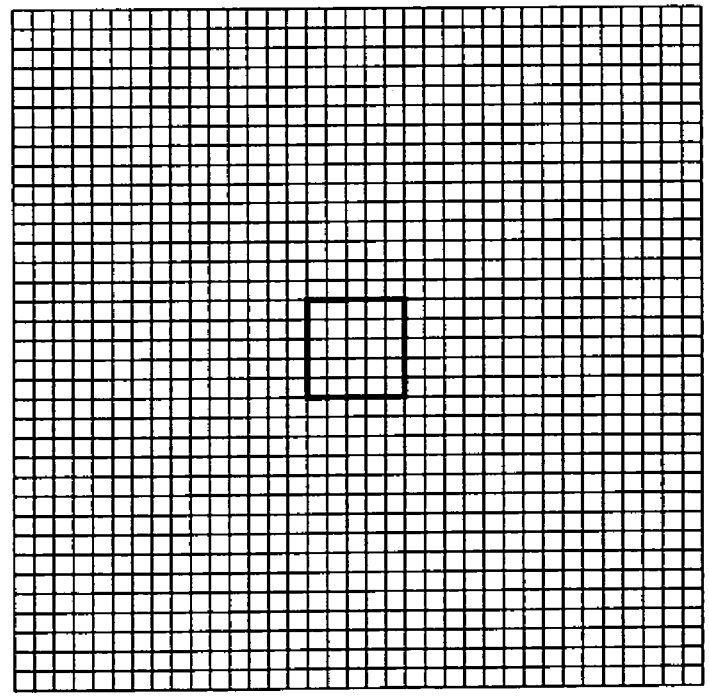

ously been determined as the dot region, a region that is actually included
IMAGE PROCESSING APPARATUS AND IMAGE PROCESSING PROGRAM PRODUCT FOR DISCRIMINATING DOT REGION IN IMAGE This application is based on Japanese Patent Application No. 2003-292434 filed with Japan Patent Office on Aug. 12, 2003, the entire content of which is hereby incorporated by reference.

BACKGROUND OF THE INVENTION

1. Field of the Invention

The present invention relates to an image processing apparatus and an image processing program product, and more particularly to an image processing apparatus and an image processing program product for discriminating a dot region in an image.

2. Description of the Related Art

An image formed on a recording medium such as a sheet of paper includes a character region where characters are represented and a dot region where gray levels of a photograph, for example, are represented. When such an image formed on the recording medium is read by a scanner or any other reader to form an image on another recording medium, the read image is subjected to appropriate image processing, which differs in the character region and in the dot region. Thus, it is desirable that the dot region is discriminated from the other region in the read image with accuracy.

Japanese Laid-Open Patent Publication No. 2002-24837 describes an image processing apparatus which includes a plurality of dot detecting means each for calculating a value corresponding to the likeliness of a dot in a prescribed region in an input image with a different window size from each other, and determining means for determining whether the prescribed region is a dot region or not based on the values corresponding to the likeliness of dots calculated by the plurality of dot detecting means.

With the image processing apparatus described in Japanese Laid-Open Patent Publication No. 2002-24837, however, the determination as to whether the prescribed region is a dot region or not is made based on whether a center pixel of an isolated dot is included in the dot region or not. As such, in the case where the isolated dot has a size greater than a pixel, the region having been determined as a dot region is reduced in size by approximately half the radius of the isolated dot. As a result, there exists, in the periphery of the region having been determined as the dot region, a region that is actually included in the dot region but determined as not included in the dot region. Such an incorrectly discriminated region is excluded from a process performed on the dot region, resulting in poor image quality in the relevant region. In particular, the degraded image quality in the periphery of the dot region may lead to conspicuous degradation in quality of the image.

SUMMARY OF THE INVENTION

The present invention has been made to solve the above-described problems. An object of the present invention is to provide an image processing apparatus permitting accurate discrimination of a dot region in an image.

Another object of the present invention is to provide an image processing program product enabling accurate discrimination of a dot region in an image.

A further object of the present invention is to provide an image processing apparatus permitting improvement in image quality of a dot region.

To achieve the above-described objects, according to an aspect of the present invention, an image processing apparatus includes an isolated dot discriminating portion which judges, for each of a plurality of pixels included in an image, whether the pixel corresponds to a center pixel of an isolated dot, a size detector which detects an isolated dot size, a dot region discriminating portion which judges whether a target pixel is included in a dot region based on a position of the pixel judged as being the center pixel of an isolated dot, and a dot region determining portion which determines a dot region based on a position of the target pixel judged as being included in the dot region and the isolated dot size detected.

According to the invention, when an isolated dot is formed of a plurality of pixels, a dot region including the plurality of pixels constituting the isolated dot is determined. As a result, it is possible to provide an image processing apparatus which can accurately determine a dot region.

Preferably, the isolated dot discriminating portion includes a plurality of calculators, each using a filter having sensitivity corresponding to an isolated dot size different from each other to calculate an evaluation value corresponding to the relevant isolated dot size for each process-target pixel, and a comparator comparing the evaluation values calculated by the plurality of calculators with prescribed threshold values.

Preferably, the dot region discriminating portion includes a counter counting the number of center pixels of isolated dots existing within a prescribed range from a process-target pixel, and a comparator comparing the counted number of the center pixels of the isolated dots with a predetermined threshold value.

Preferably, the dot region determining portion includes a tentative region determining portion determining a region within the prescribed range as a tentative region based on positions of the pixels judged as being included in the dot region, and a correcting portion correcting the determined tentative region based on the detected isolated dot size.

Preferably, the image processing apparatus further includes a processor performing prescribed processing on the image, and the processor changes a level of the prescribed processing to be performed on the determined dot region in accordance with the detected isolated dot size.

According to the invention, the level of the prescribed processing to be performed on the dot region is changed in accordance with the isolated dot size. Therefore, it is possible to provide an image processing apparatus ensuring improved image quality of the dot region.

According to another aspect of the present invention, an image processing program product makes a computer perform the step of detecting a center pixel of an isolated dot from an image, the step of detecting an isolated dot size, the step of extracting a tentative region based on a position of the center pixel of the isolated dot detected, and the step of determining a dot region by correcting the extracted tentative region based on the detected isolated dot size.

According to the invention, when an isolated dot is formed of a plurality of pixels, a dot region including the plurality of pixels constituting the isolated dot is determined. As a result, it is possible to provide an image processing program product permitting accurate determination of a dot region.

The foregoing and other objects, features, aspects and advantages of the present invention will become more appar-

BRIEF DESCRIPTION OF THE DRAWINGS

FIGS. 4A-4D show, by way of example, filters of first through fourth isolated dot discriminating portions in the region discriminating portion.

FIG. 6 shows an example of a prescribed range.

FIGS. 7A and 7B illustrate processes performed by a dot region discriminating portion in the region discriminating portion.

DESCRIPTION OF THE PREFERRED EMBODIMENTS

Figure 1:
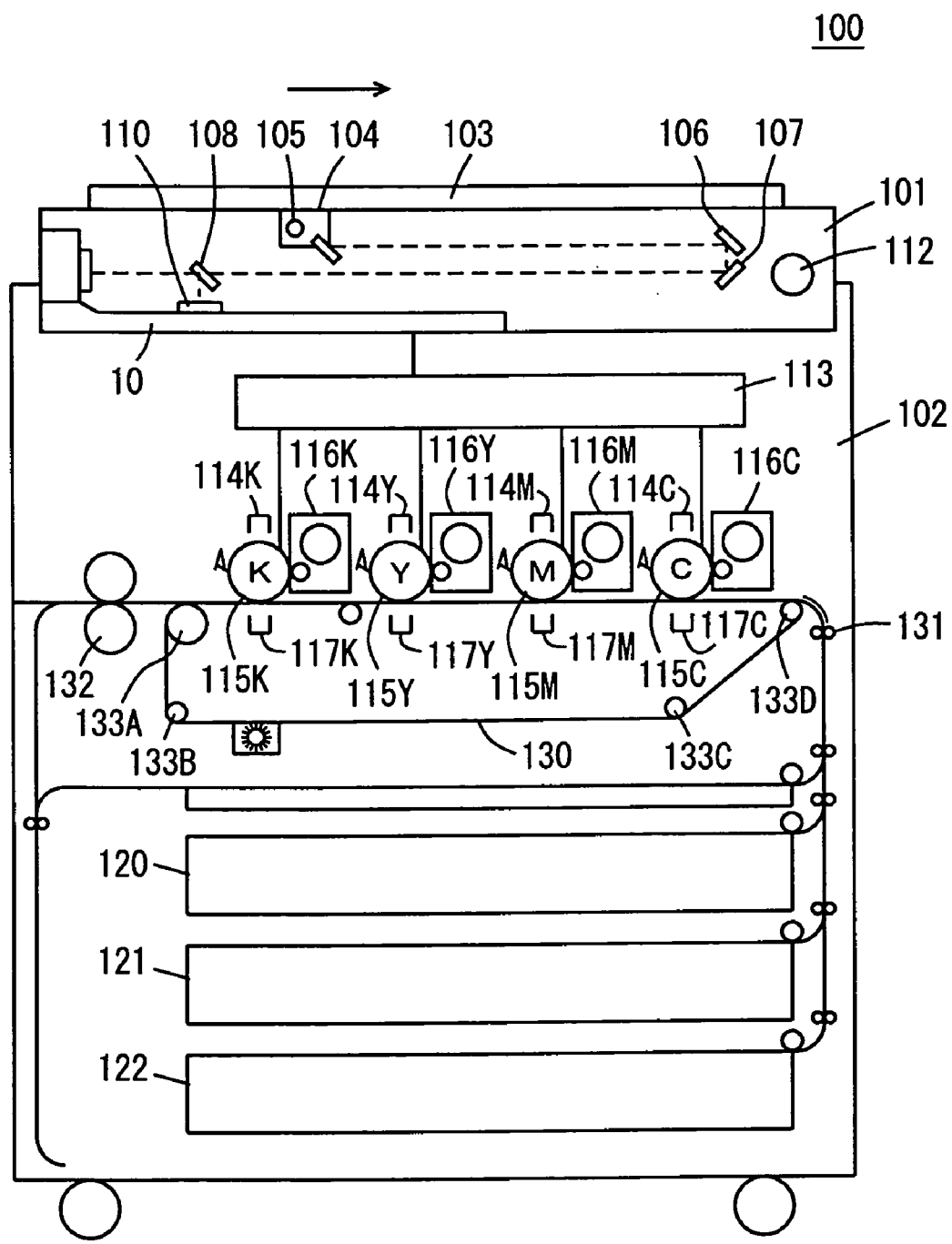
FIG. 1 is a schematic cross section showing a general configuration of a tandem color copier to which an image processing apparatus according to a first embodiment of the present invention is adapted.

Hereinafter, embodiments of the present invention will be described with reference to the drawings. In the following description, the same reference characters denote the same or corresponding parts with the same names and functions. Thus, detailed description thereof will not be repeated.

First Embodiment

FIG. 1 is a schematic cross section showing a general configuration of a tandem color copier to which an image processing apparatus of the first embodiment of the present invention is adapted. Referring to FIG. 1, the color copier 100 is formed of an image reader 101 for reading image date from an original, an image processing apparatus 10, and a printer 102 for printing the image on a sheet of paper.

The original rested on a platen 103 of image reader 101 is irradiated by an exposure lamp 105 mounted to a scanner 104. Scanner 104 scans the entire original as it is moved in an arrow direction in the figure by a scanner motor 112. Reflected light from the surface of the original focuses into an image on a CCD (Charge Coupled Device) 110 via mirrors 106-108 and a condensing lens. CCD 110 converts the reflected light from the original surface to color data (analog signals) of RGB, and outputs the same to image processing apparatus 10. The color data output from CCD 110 to image processing apparatus 10 is referred to as "image data".

Image processing apparatus 10 performs prescribed image processing on the image data received from CCD 110, and outputs digital signals to a laser device 113.

Here, the digital signals output from image processing apparatus 10 to laser device 113 include image color data C for cyan, image color data M for magenta, image color data Y for yellow, and image color data K for black. Laser device 113 outputs laser beams to photoconductor drums 115C, 115M, 115Y and 115K of cyan, magenta, yellow and black, respectively, based on the input image color data C, M, Y and K.

In printer 102, the laser beams output from laser device 113 expose photoconductor drums 115C, 115M, 115Y and 115K charged by electrostatic chargers 114C, 114M, 114Y and 114K, respectively, to form electrostatic latent images. The electrostatic latent images on photoconductor drums 115C, 115M, 115Y and 115K are then developed by developing units 116C, 116M, 116Y and 116K of four colors of cyan, magenta, yellow and black, respectively.

An endless belt 130 is suspended and kept tight by a drive roller 133A and fixed rollers 133B, 133C and 133D. As drive roller 133A rotates anti-clockwise in the figure, endless belt 130 rotates anti-clockwise in the figure at a prescribed rate.

Paper of an appropriate size is carried from one of paper feed cassettes 120-122, which is fed from a timing roller 131 onto endless belt 130. The paper fed to endless belt 130 is held thereon and carried in a left direction in the figure. As such, the paper comes into contact with photoconductor drums 115C, 115M, 115Y and 115K in order of cyan, magenta, yellow and black. As the paper contacts respective photoconductor drums 115C, 115M, 115Y and 115K, transfer chargers 117C, 117M, 117Y and 117K, respectively making pairs with the corresponding photoconductor drums, transfer toner images having been developed on the photoconductor drums onto the paper.

The paper with the toner images transferred thereon is heated with a fixing roller pair 132, and the toner is melted and fixed on the paper. The paper is then ejected from printer 102.

Figure 2:
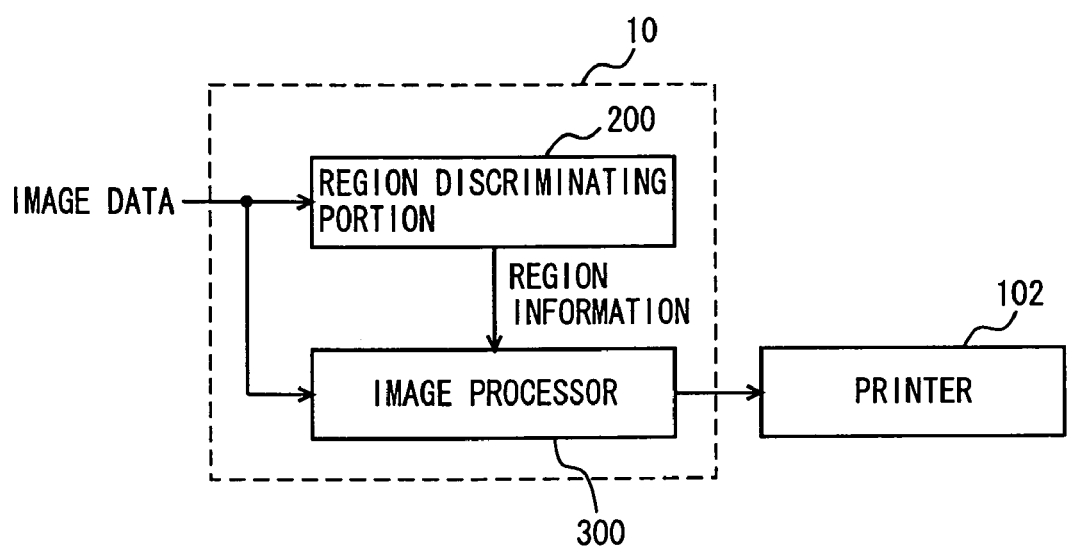
FIG. 2 is a functional block diagram illustrating functions of the image processing apparatus of the first embodiment.

FIG. 2 is a functional block diagram illustrating functions of the image processing apparatus of the first embodiment. Referring to FIG. 2, image processing apparatus 10 receives image data output from image reader 101. Image processing apparatus 10 includes a region discriminating portion 200 which divides the image data into regions corresponding to attributes of the image, and an image processor 300 which performs prescribed processing on the image data in accordance with the attributes of the image.

The regions in accordance with the attributes of the image include a dot region having dots represented therein, and a character region having one or more characters represented therein. Region discriminating portion 200 extracts the dot and character regions from the image data, and outputs information on the extracted regions to image processor 300. Upon discrimination of a dot region, region discriminating portion 200 also outputs a size of an isolated dot within the dot region to image processor 300. It is noted that the region discrimination is not restricted to discrimination of the dot and character regions. It may be configured to discriminate a graphics region including a solid image representing a graph or figure, for example.

Image processor 300 performs image processing on the image data in accordance with the regions discriminated by region discriminating portion 200. The image processing includes smoothing and edge enhancement. More specifically, the image data in the dot region is subjected to the smoothing, and the image data in the character region is subjected to the edge enhancement. In the case where a character is represented within the dot region, the edge enhancement is performed on the edge portion of the character. Image processor 300 changes levels of the smoothing and edge enhancement processes in accordance with isolated dot sizes received from region discriminating portion 200. In the smoothing process, neighboring image values are more smoothed at a higher process level. Thus, image processor 300 increases the level of the smoothing process as the size of the isolated dot is smaller. In the edge enhancement process, the edge is more enhanced at a higher process level. As such, image processor 300 increases the level of the edge enhancement process as the isolated dot size is greater. It however is preferable that the level of the edge enhancement process performed on the character within the dot region is set lower than that to be performed on the character region outside the dot region. Further, the process levels include a level where the smoothing process or the edge enhancement process is not performed, since it may be preferable for some images to avoid the smoothing or the edge enhancement. For example, performing the edge enhancement may result in conspicuous roughness at the character edge.

As described above, the level of the smoothing or edge enhancement process to be performed on the image data is changed in accordance with the isolated dot size within the dot region. Accordingly, it is possible to perform appropriate image processing on image data including a dot region of any isolated dot size, and thus, to improve the image quality of the dot region.

Figure 3:
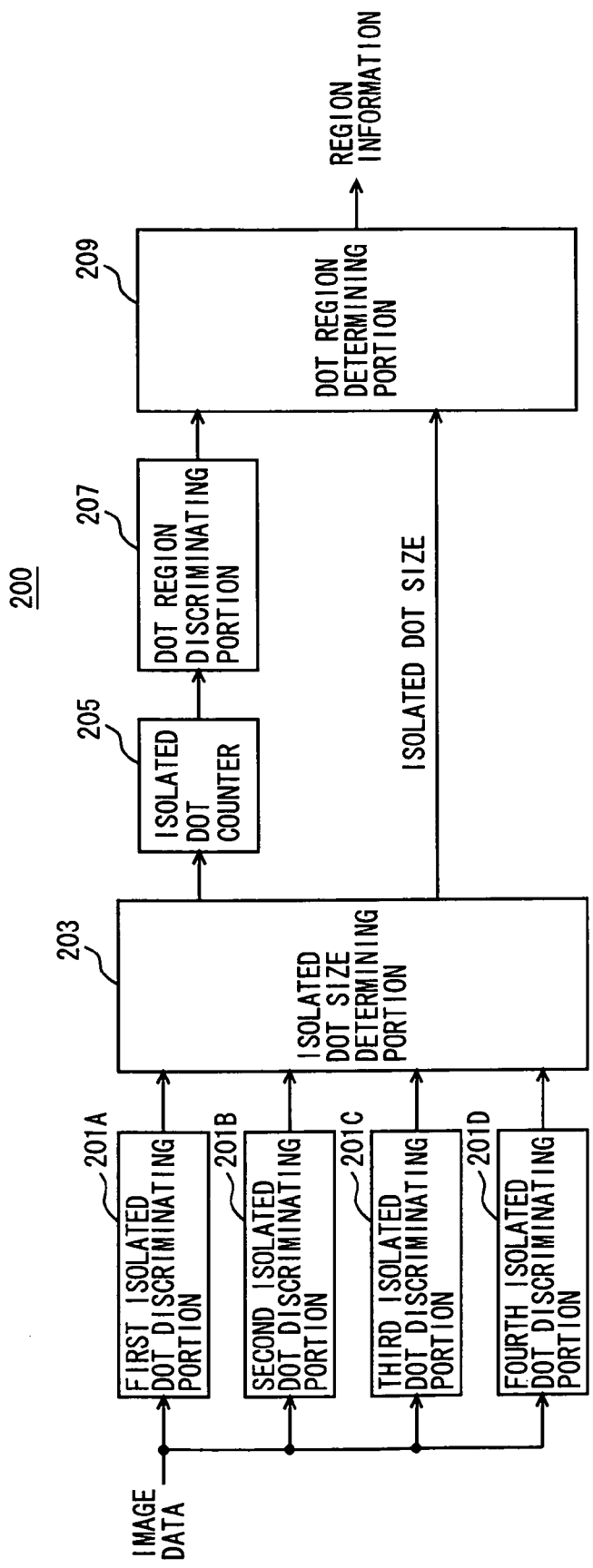
FIG. 3 is a block diagram showing a portion of a hardware configuration of a region discriminating portion.

FIG. 3 is a block diagram showing a portion of the hardware configuration of the region discriminating portion. Region discriminating portion 200 includes first through fourth isolated dot discriminating portions 201A-201D judging, for each pixel, whether the pixel is a center pixel of an isolated dot, an isolated dot size determining portion 203 determining the size of the isolated dot, an isolated dot counter 205 counting the number of center pixels of isolated dots existing in the periphery of a process-target pixel, a dot region discriminating portion 207 judging whether the process-target pixel is included in a dot region, and a dot region determining portion 209 determining the dot region based on a position of the pixel judged as being included in the dot region and the isolated dot size.

Image processing apparatus 10 further includes an analog/digital (A/D) converter which converts the input image data of analog signals to image data of digital signals. First through fourth isolated dot discriminating portions 201A-201D receive the image data of digital signals converted by the A/D converter.

Pixel values of the image data of digital signals are sequentially input into first through fourth isolated dot discriminating portions 201A-201D. First through fourth isolated dot discriminating portions 201A-201D each have a filter having sensitivity corresponding to an isolated dot size different from each other and use the filter to calculate an evaluation value for each pixel. If the calculated evaluation value satisfies a requisite condition for existence of an isolated dot (hereinafter, also referred to as the "isolated dot requisite condition"), the isolated dot discriminating portion judges that the process-target pixel is a center pixel of an isolated dot, and outputs the evaluation value to isolated dot size determining portion 203. The evaluation value is calculated from a pixel value of the process-target pixel and pixel values of the pixels in the periphery of the process-target pixel, according to a prescribed calculation formula. The filter defines positions of the pixels that are used for calculating the evaluation value, and the calculation formula.

The filters owned by first through fourth isolated dot discriminating portions 201A-201D have sensitivity corresponding to different isolated dot sizes. The filter of first isolated dot discriminating portion 201A has sensitivity corresponding to the isolated dot size of one pixel. The filters of second through fourth isolated dot discriminating portions 201B-201D have sensitivity corresponding to the isolated dot sizes of two pixels, three pixels and four pixels, respectively. As such, first isolated dot discriminating portion 201A discriminates a center pixel of an isolated dot having the isolated dot size of one pixel. Second isolated dot discriminating portion 201B discriminates a center pixel of an isolated dot having the isolated dot size of two pixels. Third isolated dot discriminating portion 201C discriminates a center pixel of an isolated dot having the isolated dot size of three pixels, and fourth isolated dot discriminating portion 201D discriminates a center pixel of an isolated dot having the isolated dot size of four pixels.

FIGS. 4A-4D show, by way of example, filters of the first through fourth isolated dot discriminating portions in the region discriminating portion. In each of FIGS. 4A-4D, a matrix of pixels in seven rows and seven columns is shown, and the filter is indicated with hatching. Each pixel in the matrix is denoted by a small letter v, followed by the row number and the column number. For example, the pixel on the upper left on the first row and the first column is represented by v11. The pixel on the seventh row and the seventh column is represented by v77. A process-target pixel corresponds to a pixel v44 on the fourth row and the fourth column. Pixels being used for calculating an evaluation value are indicated with hatching. In the following description, a pixel value of each pixel is represented by a large letter V, followed by the row number and the column number. For example, the pixel value of pixel v11 on the first row and the first column is represented by V11.

Figures 4A, 4B, 4C, 4D:
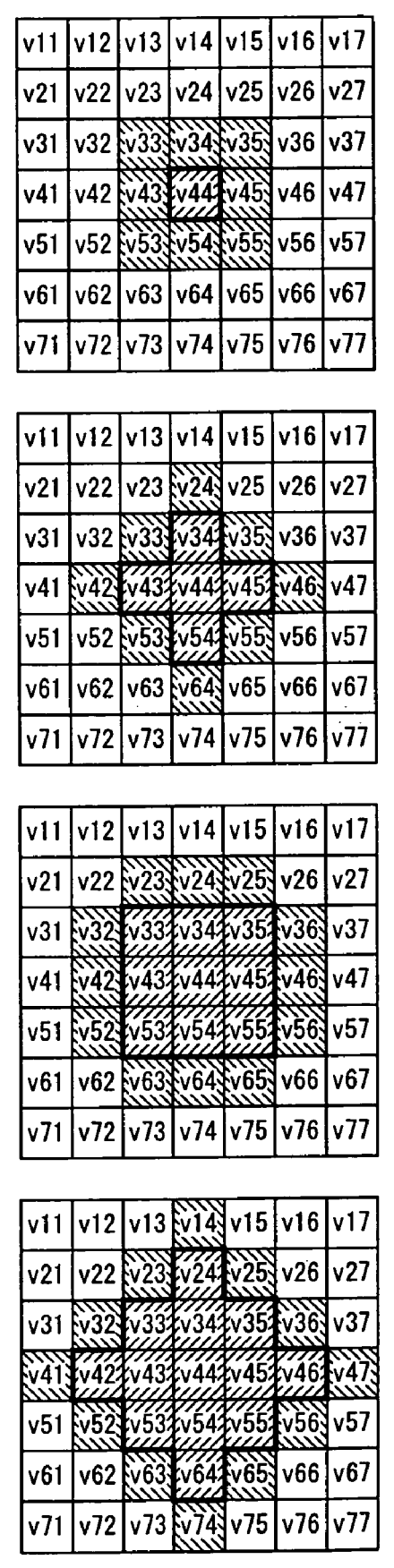

FIG. 4A shows a filter owned by first isolated dot discriminating portion 201A. This filter uses process-target pixel v44 and its peripheral pixels v33-v35, v43, v45, and v53-v55 to calculate an evaluation value E1. First isolated dot discriminating portion 201A calculates evaluation value E1 by the following expression (1).

$$E1 = V44 - \text{Max}(V33, V34, V35, V43, V45, V53, V54, V55) \quad (1)$$

where Max represents a greatest value of the pixel values in the parentheses.

FIG. 4B shows a filter of second isolated dot discriminating portion 201B. This filter uses process-target pixel v44 and its peripheral pixels v24, v33-v35, v42, v43, v45, v46, v53-55, and v64 to calculate an evaluation value E2. Second isolated dot discriminating portion 201B calculates evaluation value E2 by the following expression (2).

$$E2 = \text{Average}(V34, V43, V44, V45, V54) - \text{Max}(V24, V33, V35, V42, V46, V53, V55, V64) \quad (2)$$

where Average represents an average value of the pixel values in the parentheses.

FIG. 4C shows a filter of third isolated dot discriminating portion 201C. This filter uses process-target pixel v44 and its peripheral pixels v23-v25, v32-v36, v42, v43, v45, v46, v52-v56, and v63-v65 to calculate an evaluation value E3. Third isolated dot discriminating portion 201C calculates evaluation value E3 by the following expression (3).

$$E3=\text{Average}(V33, V34, V35, V43, V44, V45, V53, V54, V55)-\text{Max}(V23, V24, V25, V32, V36, V42, V46, V52, V56, V63, V64, V65) \quad (3)$$

FIG. 4D shows a filter owned by fourth isolated dot discriminating portion 201D. This filter uses process-target pixel v44 and its peripheral pixels v14, v23-v25, v32-v36, v41-v43, v45-v47, v52-v56, v63-v65, and v74 to calculate an evaluation value E4. Fourth isolated dot discriminating portion 201D calculates evaluation value E4 by the following expression (4).

$$E4=\text{Average}(V24, V33, V34, V35, V42, V43, V44, V45, V46, V53, V54, V55, V64)-\text{Max}(V14, V23, V25, V32, V36, V41, V47, V52, V56, V63, V65, V74) \quad (4)$$

First through fourth isolated dot discriminating portions 201A-201D each judge whether the process-target pixel is a center pixel of an isolated dot when corresponding one of the following isolated dot requisite conditions 1-4 is met.

Requisite condition 1 for first isolated dot discriminating portion 201A: E1>REF1

Requisite condition 2 for second isolated dot discriminating portion 201B: E2>REF2

Requisite condition 3 for third isolated dot discriminating portion 201C: E3>REF3

Requisite condition 4 for fourth isolated dot discriminating portion 201D: E4>REF4

For requisite conditions 1-4, evaluation values E1-E4 are compared with predetermined threshold values REF1-REF4, respectively. Threshold values REF1-REF4 are determined in accordance with characteristics of image reader 101. Threshold values REF1-REF4 are preferably determined taking account of noise in the image data.

First through fourth isolated dot discriminating portions 201A-201D output evaluation values E1-E4, respectively, to isolated dot size determining portion 203 when the corresponding isolated dot requisite conditions 1-4 are met.

Figure 5:
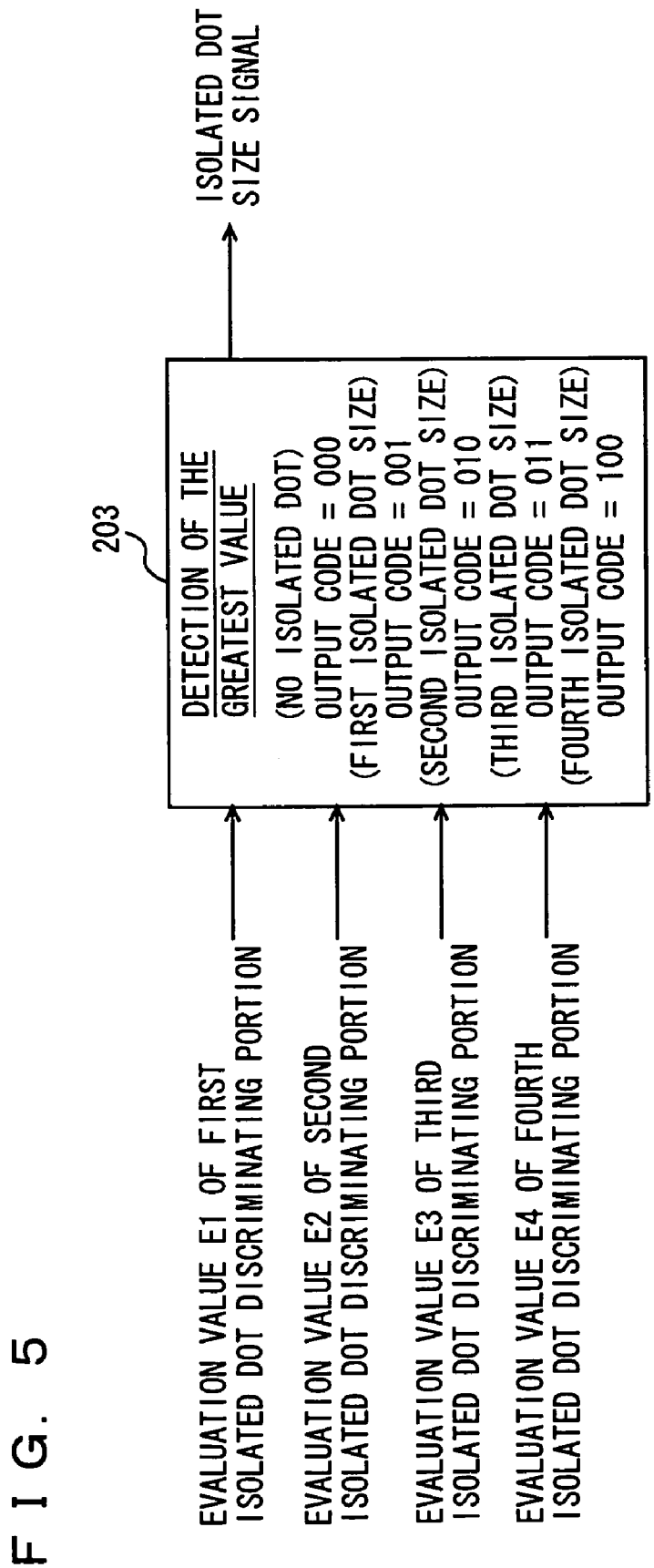
FIG. 5 is a functional block diagram illustrating functions of an isolated dot size determining portion 203 in the region discriminating portion.

Isolated dot size determining portion 203 compares the input evaluation values with each other, and determines the isolated dot size corresponding to the greatest evaluation value. FIG. 5 is a functional block diagram showing functions of isolated dot size determining portion 203. Referring to FIG. 5, isolated dot size determining portion 203 receives evaluation values E1-E4 from first through fourth isolated dot discriminating portions 201A-201D, respectively. If there is no evaluated value received from any of first through fourth isolated dot discriminating portions 201A-201D, then it determines that the process-target pixel is not a center pixel of an isolated dot, and outputs an output code "000" as an isolated dot size signal.

When an evaluation value is input from any of first through fourth isolated dot discriminating portions 201A-201D, then it detects the greatest one of the input evaluation values E1-E4, and identifies which one of first through fourth isolated dot discriminating portions 201A-201D has output the greatest evaluation value. When it identifies first isolated dot discriminating portion 201A, it determines that the process-target pixel is the center pixel of an isolated dot having the isolated dot size of one pixel, and outputs an output code "001" as the isolated dot size signal. When it identifies second isolated dot discriminating portion 201B, it determines that the process-target pixel is the center pixel of an isolated dot having the isolated dot size of two pixels, and outputs an output code "010" as the isolated dot size signal. When it identifies third isolated dot discriminating portion 201C, it determines that the process-target pixel is the center pixel of an isolated dot with the isolated dot size of three pixels, and outputs an output code "011" as the isolated dot size signal. When it identifies fourth isolated dot discriminating portion 201D, it determines that the process-target pixel is the center pixel of an isolated dot having the isolated dot size of four pixels, and outputs an output code "100" as the isolated dot size signal.

Isolated dot size determining portion 203 further outputs to isolated dot counter 205 a signal indicating that the process-target pixel corresponds to a center pixel of an isolated dot. The signal output from isolated dot size determining portion 203 to isolated dot counter 205 is information indicating a position of the process-target pixel within the image, which specifically shows the position of the center pixel of the isolated dot.

Isolated dot counter 205 counts the number of center pixels of isolated dots existing within a prescribed range from a target pixel to be processed, based on the positions of the center pixels of isolated dots output from isolated dot size determining portion 203. In the present embodiment, the prescribed range is a rectangular region of 25 pixels in row and 25 pixels in column centered on the process-target pixel.

FIG. 6 shows an example of the prescribed range. The pixels provided with hatching in the figure show those judged as being center pixels of isolated dots. The pixels in 13 rows and 13 columns at the center of the prescribed range of 25 rows and 25 columns correspond to the process-target pixels. It is noted that the size of the prescribed range is not limited thereto but rather may be changed in accordance with resolution of image data, an isolated dot size, and others. The size of the prescribed range may be set such that it includes a greater number of isolated dots in the dot region than in a region other than the dot region.

Isolated dot counter 205 counts, for each process-target pixel, the number of center pixels of isolated dots existing within the prescribed range centered on the process-target pixel, and outputs the count value to dot region discriminating portion 207. Isolated dot counter 205 receives only the positions of the center pixels of isolated dots, and it counts the center pixels of isolated dots irrelevant to the sizes of the isolated dots. That is, the center pixels of isolated dots of any isolated dot sizes are counted.

Dot region discriminating portion 207 judges whether the process-target pixel is included in a dot region, based on the count value received from isolated dot counter 205. Dot region discriminating portion 207 compares the input count value with a prescribed threshold value TH. Threshold value TH is a predetermined value which is set in accordance with density of isolated dots in the image data. It is noted that threshold value TH may be set greater as the isolated dot size is smaller, or may be set smaller as the isolated dot size is greater. Dot region discriminating portion 207 outputs a signal indicating whether the process-target pixel is included in a dot region to dot region determining portion 209. Here, instead of comparing the count value with the threshold value, a ratio between the count value and the number of pixels within a prescribed range may be compared with another threshold value. Alternatively, a ratio of an area of isolated dots with respect to an area of the prescribed range may be compared with a threshold value, taking account of the isolated dot size.

FIGS. 7A and 7B illustrate processing performed by the dot region discriminating portion of the region discriminating portion. FIG. 7A shows a portion of image data, where pixels are shown as a matrix. FIG. 7B shows pixels judged as being in a dot region by dot region discriminating portion 207, where the pixels judged as being in the dot region are delimited by a rectangular shape of heavy line.

Although the case where the pixels judged as being in the dot region are enclosed in a rectangular region is shown, the region does not necessarily become a rectangular shape, since dot region discriminating portion 207 sequentially processes the process-target pixels.

Alternatively, dot region discriminating portion 207 may be configured to determine a smallest rectangular region including the pixels determined as being the center pixels of isolated dots by isolated dot size determining portion 203, and to decide that the process-target pixel is in the dot region when the process-target pixel is included in the relevant rectangular region. In this case, isolated dot counter 205 becomes unnecessary.

Dot region determining portion 209 determines the dot region within the image based on the positions of the pixels judged as being in the dot region and the isolated dot size. The processes being performed by dot region determining portion 209 include a determining process of a tentative region and a correcting process of the tentative region. The tentative region determining process is a process of determining a region within a prescribed range from a process-target pixel as a tentative region when dot region discriminating portion 207 judges that the process-target pixel is included in a dot region. The prescribed range is the same as that used by isolated dot counter 205, which is here a region of 25 pixels in row and 25 pixels in column centered on the process-target pixel.

Figure 8A:
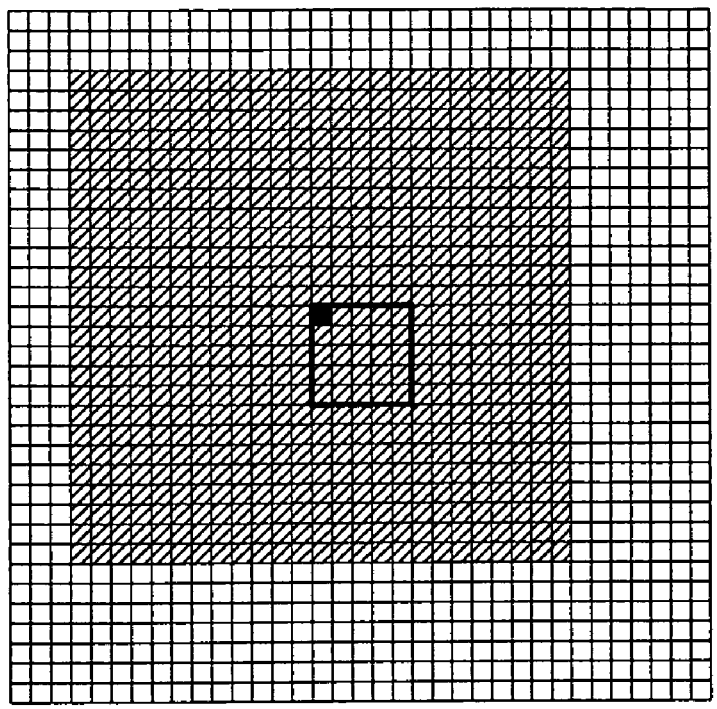
FIGS. 8A and 8B illustrate a tentative region determining process.
Figure 8B:
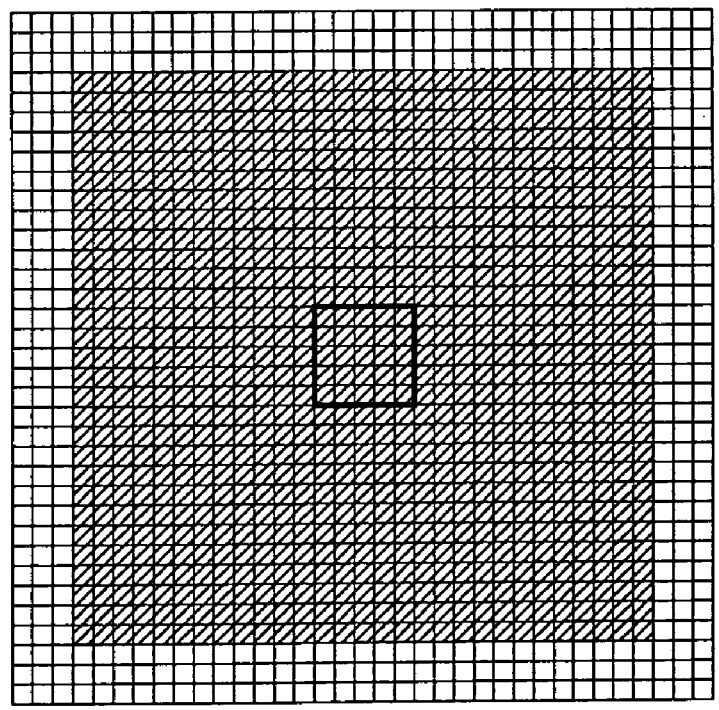

FIGS. 8A and 8B illustrate the tentative region determining process. FIG. 8A shows the pixels judged as being in the dot region by dot region discriminating portion 207 as a region surrounded by a rectangular shape of heavy line. In FIG. 8A, a tentative region that is determined when the process-target pixel corresponds to the upper left pixel in the region surrounded by the rectangular shape of bole line is shown with hatching. The tentative region is a region of 25 pixels in row and 25 pixels in column centered on the upper left pixel within the heavy-line rectangular region. FIG. 8B shows a tentative region that is determined by sequentially processing all the pixels included in the region surrounded by the heavy-line rectangular shape. The tentative region is shown with hatching.

Although the tentative region is shown as a rectangular region in FIG. 8B, it will not become a rectangular region if the pixels judged as being in the dot region by dot region discriminating portion 207 form a non-rectangular region.

The tentative region correcting process is a process of expanding the determined tentative region in accordance with the isolated dot size output from isolated dot size determining portion 203, and the resulting region is determined as a dot region. As described above, in the tentative region determining process, the tentative region is determined using position information of center pixels of isolated dots, irrelevant to the isolated dot size. Thus, the same tentative region will be obtained regardless of a variety of isolated dot sizes. The tentative region correcting process is for correcting the tentative region in accordance with the isolated dot size. The amount of expansion of the tentative region corresponds to the number of pixels of not greater than half the isolated dot size. When the isolated dot size is one pixel, the expanded amount is zero pixel. When the isolated dot size is two pixels, the expanded amount is one pixel. When the isolated dot size is three pixels, the expanded amount is one pixel, and when the isolated dot size is four pixels, the expanded amount is two pixels. Dot region determining portion 209 sequentially processes the process-target pixels. Thus, if isolated dot size determining portion 203 determines that a process-target pixel is not a center pixel of an isolated dot, then the isolated dot size of the pixel processed prior to the process-target pixel may be used.

Figure 9:
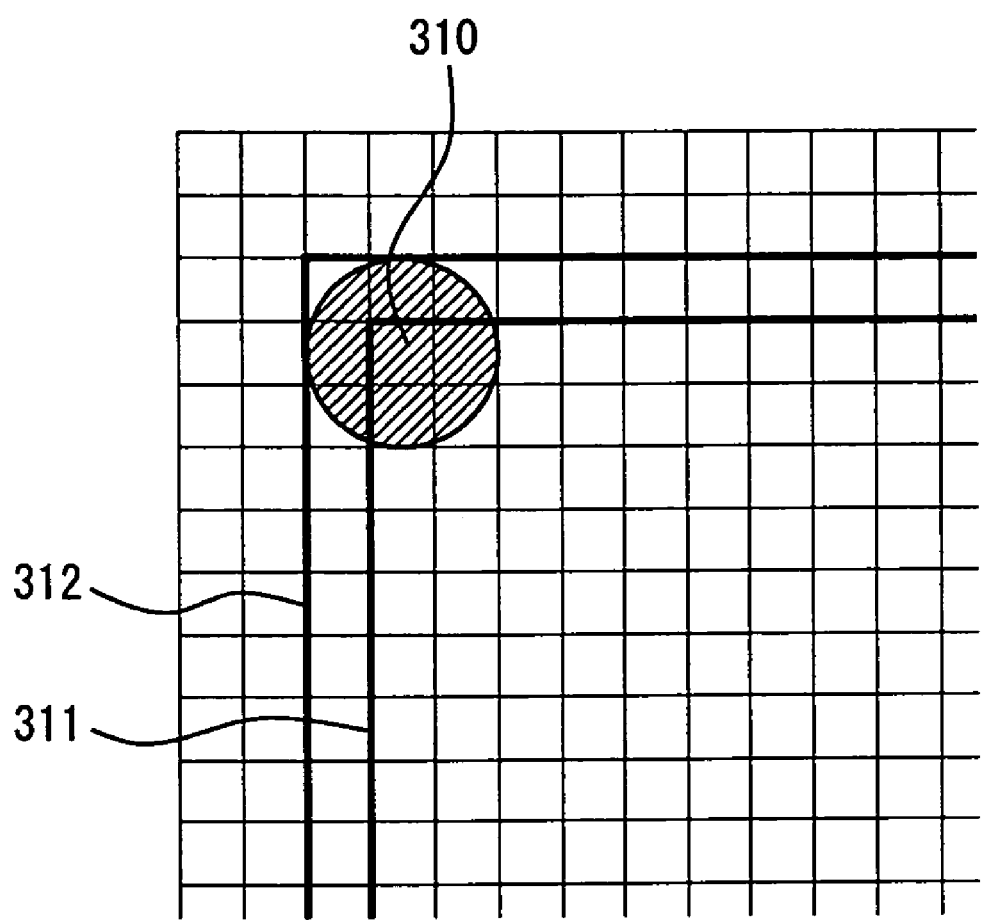
FIG. 9 illustrates a region correcting process.

FIG. 9 illustrates the tentative region correcting process. Referring to FIG. 9, attention is paid to a pixel in the periphery of tentative region 311, here, the pixel 310 on the upper left corner of tentative region 311. Assuming that pixel 310 is a center pixel of an isolated dot having an isolated dot size of three pixels, the isolated dot is indicated as a region with hatching in FIG. 9. The region of this isolated dot clearly protrudes beyond the tentative region 311. In the tentative region correcting process, tentative region 311 is corrected to obtain a dot region 312 including the entire isolated dot, with the correction made by the number of pixels of not greater than half the isolated dot size. As such, according to the tentative region correcting process, it is ensured that the pixels constituting the isolated dot are all included in the dot region.

Figure 10A:
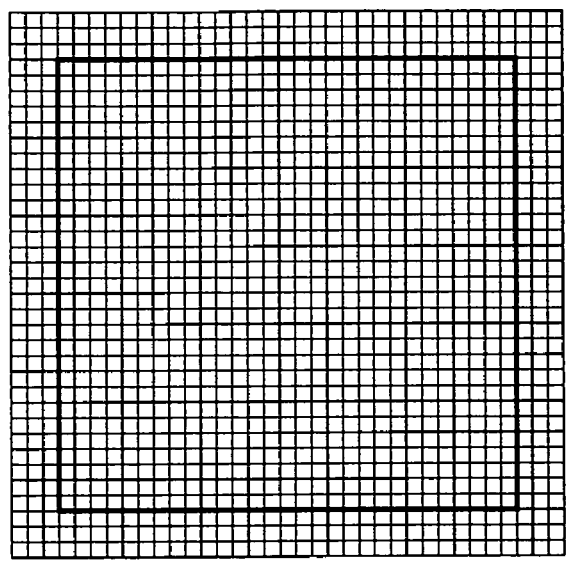
FIGS. 10A-10C show specific examples of the tentative region correcting process.
Figure 10B:
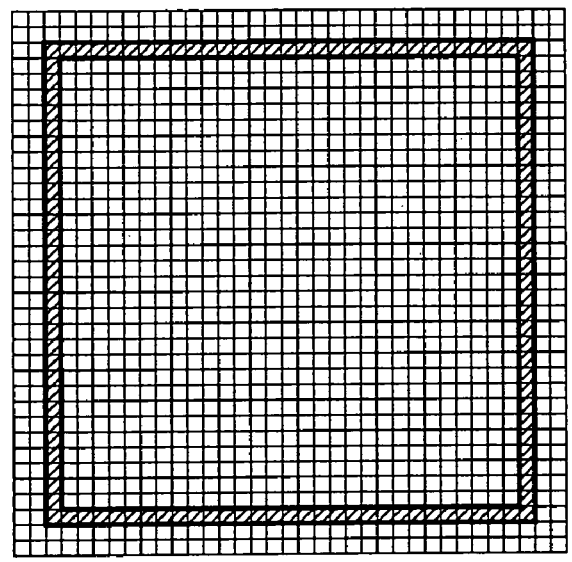
Figure 10C:
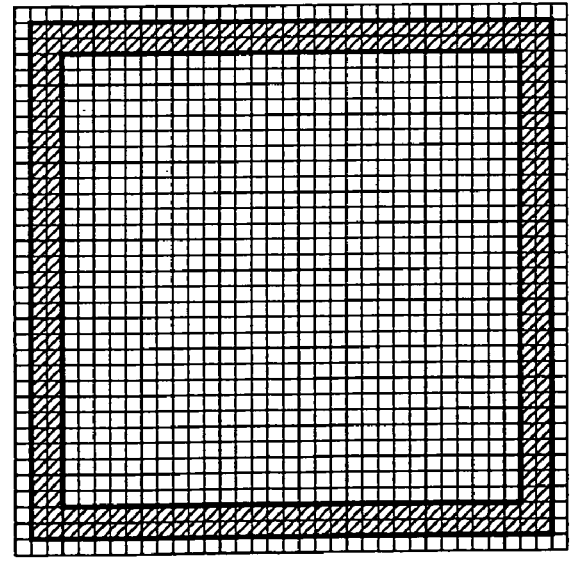

Specific examples of the tentative region correcting process are now explained. FIG. 10A shows a dot region in the case where the isolated dot size is one pixel. The dot region is shown as a region delimited by a rectangular shape of heavy line. Since the expanded amount is zero pixel with the isolated dot size of one pixel, the tentative region becomes a dot region without modification. FIG. 10B shows a dot region in the case where the isolated dot size is two or three pixels. The dot region is shown as a region enclosed by a heavy-line rectangular shape. Since the expanded amount is one pixel with the isolated dot size of two or three pixels, the tentative region is expanded by one pixel in every direction to obtain a dot region. The expanded portion is shown with hatching. FIG. 10C shows a dot region in the case where the isolated dot size is four pixels. Since the expanded amount is two pixels with the isolated dot size of four pixels, the tentative region is expanded by two pixels in every direction to obtain a dot region. The expanded portion is shown with hatching.

Instead of correcting the tentative region, a prescribed range for use in determining the tentative region may be changed in accordance with the isolated dot size. Specifically, when the isolated dot size is one pixel, a region of 25 pixels in row and 25 pixels in column centered on a process-target pixel may be determined as a tentative region. When the isolated dot size is two or three pixels, a region of 26 pixels in row and 26 pixels in column centered on a process-target pixel may be determined as a tentative region. When the isolated dot size is four pixels, a region of 27 pixels in row and 27 pixels in column centered on a process-target pixel may be determined as a tentative region. In this case, the tentative region correcting process becomes unnecessary.

As described above, according to image processing apparatus 10 of the first embodiment, the dot region is determined using the isolated dot size, in addition to the positions of the center pixels of the isolated dots. Therefore, it is possible to determine a dot region with accuracy.

Modification of Region Discriminating Portion

Figure 11:
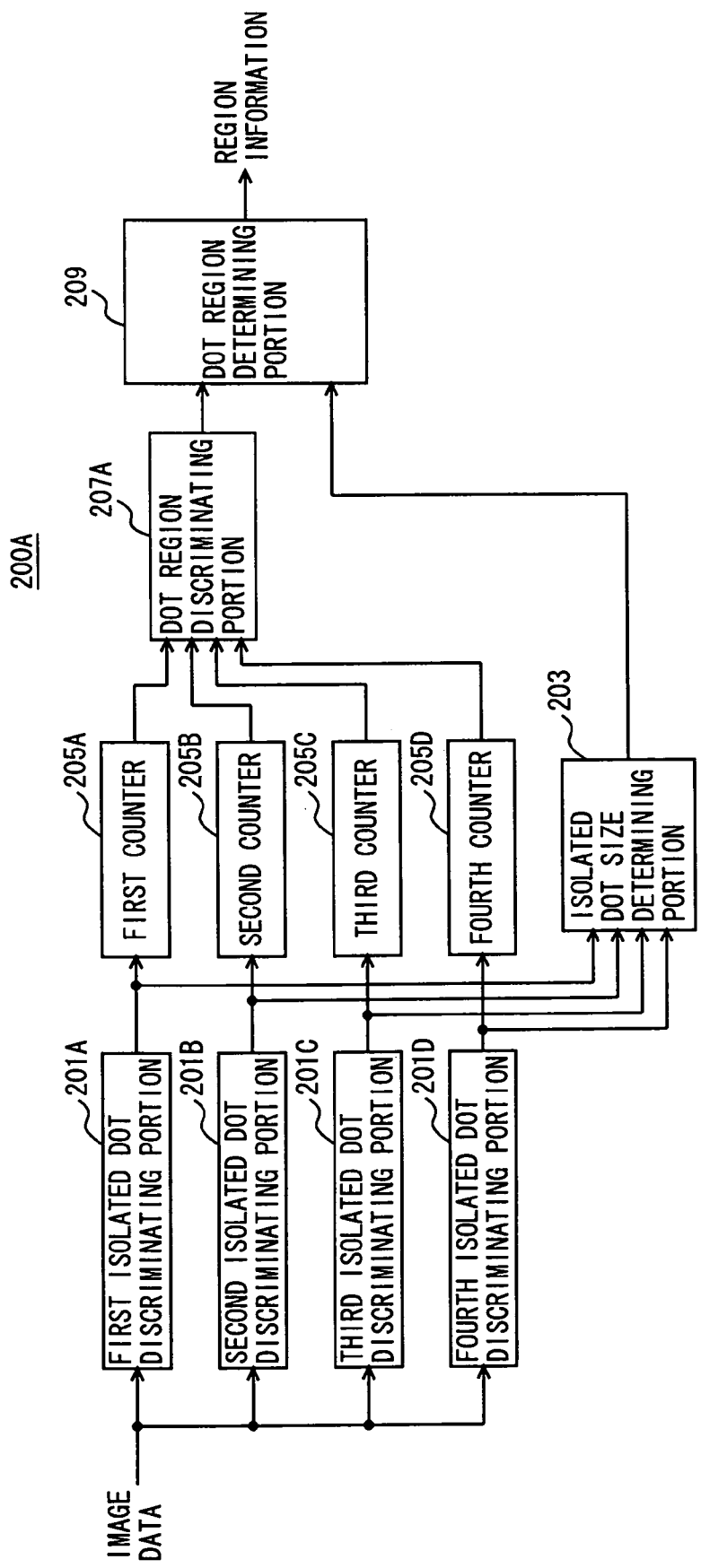
FIG. 11 is a block diagram showing a portion of a hardware configuration of a modified region discriminating portion of the first embodiment.

A modification of region discriminating portion 200 is now described. FIG. 11 is a block diagram showing a portion of the hardware configuration of a modified region discriminating portion 200A. Region discriminating portion 200A includes first through fourth isolated dot discriminating portions 201A-201D which each judge, for each pixel, whether the pixel corresponds to a center pixel of an isolated dot, first through fourth isolated dot counters 205A-205D which are connected to first through fourth isolated dot discriminating portions 201A-201D, respectively, and count the numbers of isolated dots of respective isolated dot sizes, an isolated dot size determining portion 203 which determines the size of the isolated dot, a dot region discriminating portion 207A which is connected to first through fourth isolated dot counters 205A-205D and judges whether a process-target pixel is included in a dot region, and a dot region determining portion 209 which determines a dot region based on positions of the pixels judged as being included in the dot region and the isolated dot size.

Region discriminating portion 200A differs from the above-described region discriminating portion 200 in that it includes first through fourth isolated dot counters 205A-205D instead of isolated dot counter 205. Correspondingly, the process to be performed by dot region discriminating portion 207A differs from the process performed by the above-described dot region discriminating portion 207.

First isolated dot discriminating portion 201A discriminates a center pixel of an isolated dot having the isolated dot size of one pixel, and outputs a signal indicating that the process-target pixel is the center pixel of the isolated dot to first counter 205A. Second isolated dot discriminating portion 201B discriminates a center pixel of an isolated dot having the isolated dot size of two pixels, and outputs a signal indicating that the process-target pixel is the center pixel of the isolated dot to second counter 205B. Third isolated dot discriminating portion 201C discriminates a center pixel of an isolated dot having the isolated dot size of three pixels, and outputs a signal indicating that the process-target pixel is the center pixel of the isolated dot to third counter 205C. Fourth isolated dot discriminating portion 201D discriminates a center pixel of an isolated dot having the isolated dot size of four pixels, and outputs a signal indicating that the process-target pixel is the center pixel of the isolated dot to fourth counter 205D.

First isolated dot counter 205A counts the number of center pixels of isolated dots existing within a prescribed range from a process-target pixel, based on the positions of the center pixels of isolated dots output from first isolated dot discriminating portion 201A. Since first isolated dot discriminating portion 201A outputs the positions of the center pixels of isolated dots having the isolated dot size of one pixel, first isolated dot counter 205A counts the number of the center pixels of isolated dots with the isolated dot size of one pixel that exist within a prescribed range from the process-target pixel. The counted number of the center pixels of the isolated dots with the isolated dot size of one pixel is output to dot region discriminating portion 207A. The prescribed range corresponds to a rectangular region of 25 pixels in row and 25 pixels in column centered on the process-target pixel.

Similarly, second isolated dot counter 205B counts the number of center pixels of isolated dots having the isolated dot size of two pixels existent within a prescribed range from the process-target pixel. Third isolated dot counter 205C counts the number of center pixels of isolated dots having the isolated dot size of three pixels existent within a prescribed range from the process-target pixel. Fourth isolated dot counter 205D counts the number of center pixels of isolated dots having the isolated dot size of four pixels existent within a prescribed range from the process-target pixel. The numbers of the center pixels of isolated dots counted by second through fourth isolated dot counters 205B-205D are output to dot region discriminating portion 207A.

Dot region discriminating portion 207A judges whether the process-target pixel is included in a dot region based on the count values output from first through fourth isolated dot counters 205A-205D.

Dot region discriminating portion 207A compares a greatest one of the count values output from first through fourth isolated dot counters 205A-205D with a prescribed threshold value TH. When the greatest count value exceeds threshold value TH, it outputs a signal indicating that the process-target pixel is included in the dot region to dot region determining portion 209. Threshold value TH is a value predetermined according to the density of isolated dots in the image data. Threshold value TH may be set greater as the isolated dot size is smaller, or may be set smaller as the isolated dot size is greater. Dot region discriminating portion 207A outputs a signal indicating whether the process-target pixel is included in a dot region to dot region determining portion 209. Instead of comparing the count value with the threshold value, it may be configured to compare a ratio between the count value and the number of pixels within the prescribed range with another threshold value. Alternatively, it may be configured to compare a ratio of an area of the isolated dots with respect to an area of the prescribed range with a threshold value.

Further, dot region discriminating portion 207A may be configured to decide that the process-target pixel is not included in a dot region in the case where the greatest count value and the next greatest count value among the count values output from first through fourth isolated dot counters 205A-205D both exceed a threshold value TH. As such, it is possible to prevent the event that a dot region is incorrectly discriminated by noise within the image data when the isolated dots in the image have the same size.

Still further, dot region discriminating portion 207A may be configured to decide that the process-target pixel is included in a dot region in the case where a sum of the greatest count value and another count value among the count values output from first through fourth isolated dot counters 205A-205D exceeds a threshold value TH even if the greatest count value is not greater than the threshold value TH. The another count value is a count value of the isolated dot size that is close to the isolated dot size corresponding to the greatest count value. When the isolated dot size corresponding to the greatest count value is two pixels, for example, then the another count value corresponds to the isolated dot size of one or three pixels. In the case where the isolated dot size in the image is greater than one pixel and smaller than two pixels, for example, it may be discriminated by first isolated dot discriminating portion 201A supposed to discriminate the isolated dot size of one pixel, or it may be discriminated by second isolated dot discriminating portion 201B supposed to discriminate the isolated dot size of two pixels. Thus, even for an image having a dot region consisting of isolated dots with an isolated dot size of greater than one pixel and smaller than two pixels, the dot region can be determined with accuracy by comparing the sum of the number of the center pixels of isolated dots having the isolated dot size of one pixel and the number of the center pixels of isolated dots having the isolated dot size of two pixels with threshold value TH.

Instead of comparing the count value with threshold value TH, it may be configured to compare a ratio between the count value and the number of pixels within the prescribed range with another threshold value. Alternatively, it may be configured to compare a ratio of an area of the isolated dots with respect to an area of the prescribed range with a threshold value.

Second Embodiment

Figure 12:
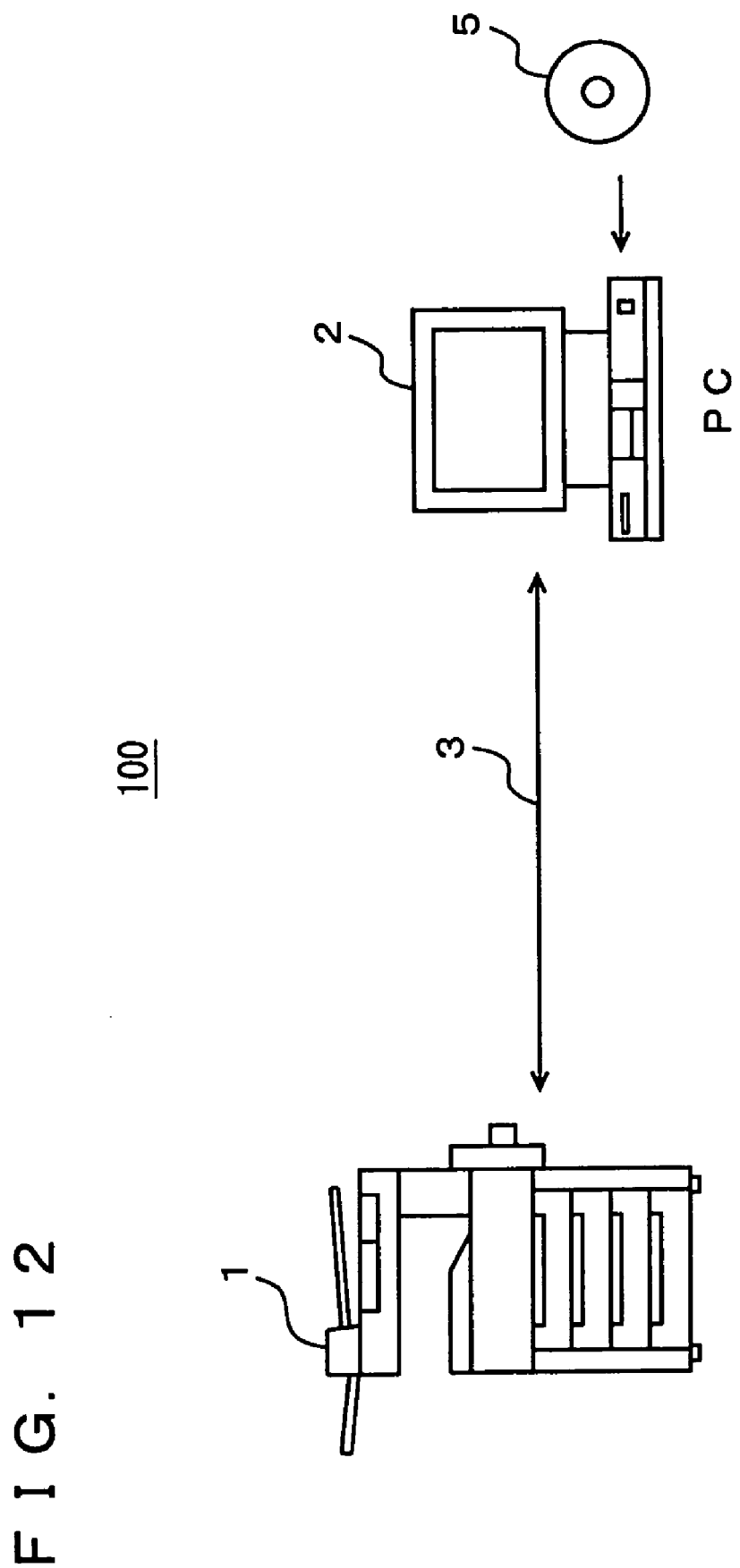
FIG. 12 schematically shows an overall structure of a print system according to a second embodiment of the present invention.

An image processing apparatus according to the second embodiment of the present invention is now described. FIG. 12 shows an overall structure of a print system according to the second embodiment. Referring to FIG. 12, the image processing apparatus 2 is connected to a multi function peripheral (MFP) 1 via a network 3.

Image processing apparatus 2 is a general personal computer. Its hardware configuration is well known, and thus, description thereof is not repeated here. Image processing apparatus 2 reads an image processing program recorded on a recording medium 5 such as a CD-ROM or the like, and executes the same by a CPU (Central Processing Unit).

Such an image processing program is generally stored in a recording medium such as a CD-ROM 5 for distribution. The program is read from recording medium 5 by a CD-ROM drive or the like that is accommodated in image processing apparatus 2, and temporarily stored on a hard disc. It is then read from the hard disc onto a random access memory (RAM) for execution by the CPU.

Recording medium 5 is not restricted to a CD-ROM or a hard disc. It may be a recording medium fixedly storing a program, such as a flexible disc, a cassette tape, an optical disc (MO (Magnetic Optical disc), MD (Mini Disc), DVD (Digital Versatile Disc)), an IC card (including a memory card), an optical card, or a semiconductor memory including mask ROM, EPROM, EEPROM, and flash ROM.

The image processing program as stated herein is a concept including, not only a program directly executable by a CPU, but also a program in the form of source program, a compressed program, an encrypted program, and others.

MFP 1 includes a scanner for reading an original, an image generator for generating an image on a recording medium such as paper based on image data, and a facsimile, and has an image reading function, a copying function, and a facsimile sending/receiving function.

Network 3 may be a local area network (LAN), the Internet, or a public switched telephone network, either wired or wireless. Although the case where MFP 1 and image processing apparatus 2 are connected via network 3 is shown, MFP 1 and image processing apparatus 2 may be connected via a serial or parallel line.

Image processing apparatus 2 receives data from MFP 1 obtained by reading an original, and performs image processing as will be described later. Image processing apparatus 2 may perform the processing, not only on the image data received from MFP 1, but also on image data recorded on recording medium 5, and on image data received from another computer via network 3. Further, it may receive image data taken by a digital still camera, a digital video camera or the like, directly therefrom.

Image processing apparatus 2 performs a region discriminating process on the image data, and performs the image processing in accordance with the discriminated regions. The image processing includes smoothing and edge enhancement. For the image data of a region discriminated as being a dot region by the region discriminating process, image processing apparatus 2 changes levels of the smoothing and edge enhancement processes in accordance with an isolated dot size. More specifically, image processing apparatus 2 increases the level of the smoothing process for a smaller isolated dot size, and increases the level of the edge enhancement process for a greater isolated dot size. There is a level where the smoothing process or the edge enhancement process is not performed, since it may be preferable for some images not to perform the smoothing or edge enhancement process thereon. For example, the edge enhancement may undesirably emphasize the roughness of the character edge.

As such, image processing apparatus 2 changes the level of the smoothing or edge enhancement process to be performed on image data in accordance with the isolated dot size within the dot region. Accordingly, it is possible to perform appropriate image processing on image data including a dot region of any isolated dot size.

Figure 13:
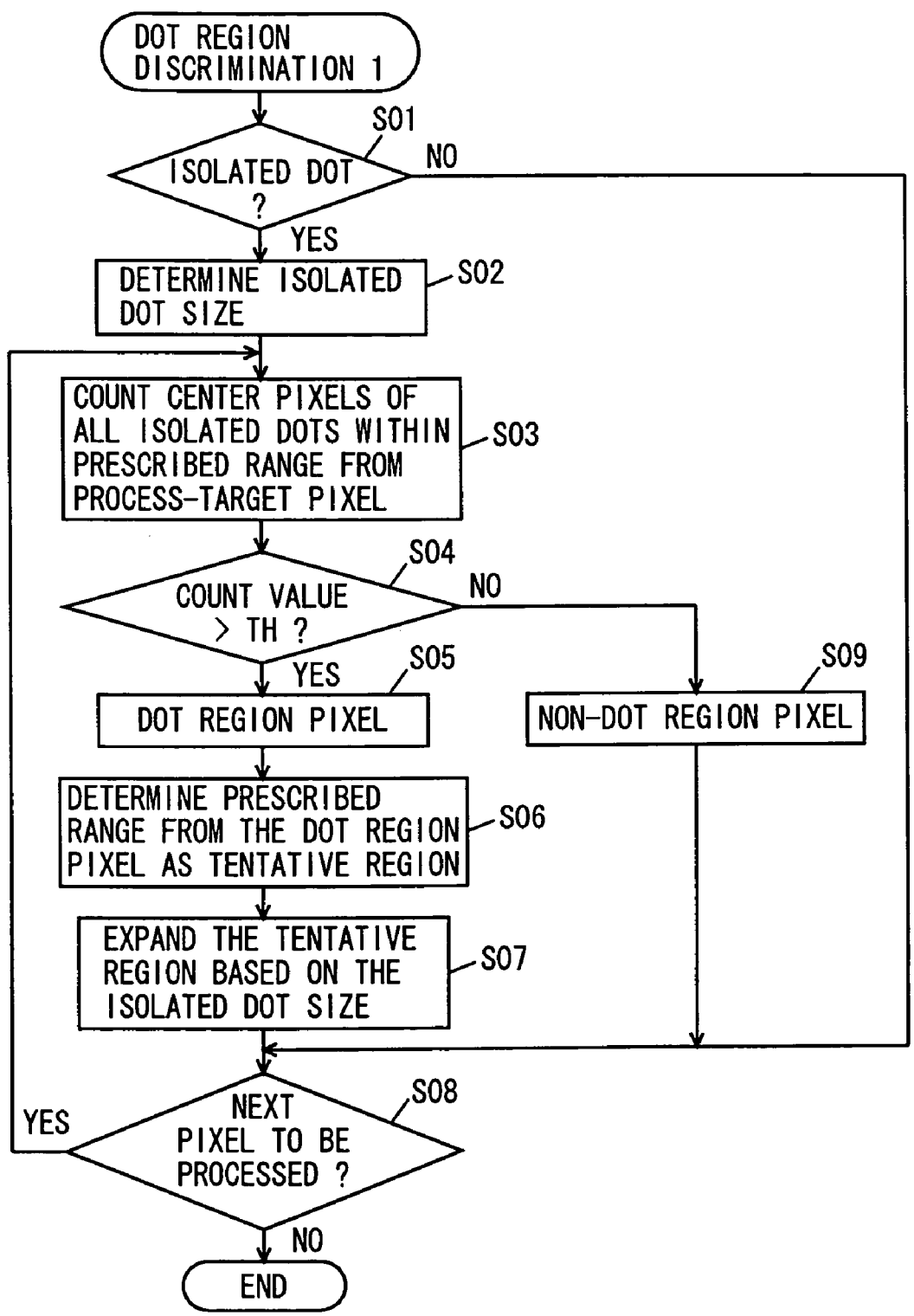
FIG. 13 is a flowchart illustrating a flow of a dot region discriminating process performed in the image processing apparatus of the second embodiment.

FIG. 13 is a flowchart showing a flow of a dot region discriminating process that is performed by the image processing apparatus of the second embodiment. Image processing apparatus 2 sequentially processes the values of pixels in the image data, and determines whether the process-target pixel corresponds to a center pixel of an isolated dot (step S01). Specifically, it uses the four filters shown in FIGS. 4A-4D to calculate evaluation values, and determines whether each evaluation value satisfies an isolated dot requisite condition. It then determines the isolated dot size corresponding to the filter with which a greatest evaluation value satisfying the isolated dot requisite condition was obtained (step S02).

The processes in steps S01-S02 are performed on all pixels in the image data. As such, for every pixel in the image data, information as to whether it is a center pixel of an isolated dot and, if so, information of the isolated dot size are collected.

Next, the number of center pixels of all the isolated dots within a prescribed range from the process-target pixel is counted (step S03). The prescribed range is a rectangular region of 25 pixels in row and 25 pixels in column centered on the process-target pixel, as described in the first embodiment, although the size of the prescribed range may be changed in accordance with resolution of the image data, an isolated dot size or the like. The prescribed range may be set such that it includes a greater number of isolated dots in the dot region than in a region other than the dot region. In step S03, the number of the center pixels of the isolated dots is counted irrelevant to the sizes of the isolated dots. That is, the number of the center pixels of isolated dots of all the isolated dot sizes is counted.

It is then determined whether the count value exceeds a threshold value TH (step S04). If so, process proceeds to step S05. If the count value is not greater than threshold value TH, then process proceeds to step S09, and the process-target pixel is determined as a non-dot region pixel existing outside a dot region.

In step S05, the process-target pixel having its count value exceeding threshold value TH is determined as a dot region pixel existing in a dot region. A prescribed range from the dot region pixel is determined as a tentative region (step S06). The prescribed range is the same as the prescribed range used to count the isolated dots in step S03. Here, it is the region of 25 pixels in row and 25 pixels in column centered on the process-target pixel.

Next, the determined tentative region is expanded in accordance with the isolated dot size determined in step S02 (step S07). The expanded region is determined to be included in a dot region. Here, the expansion is performed in the same manner as in image processing apparatus 10 of the first embodiment, and thus, description thereof is not repeated.

In the next step S08, it is determined whether there is another pixel to be processed. If so, process returns to step S03, and the above-described processes are repeated. If there is no more pixel to be processed, the process is completed.

As such, the processes in steps S03-S09 are performed on all the pixels in the image data, and a dot region is ultimately determined based on the regions determined to be included in the dot region.

First Modification of Dot Region Discriminating Process

Figure 14:
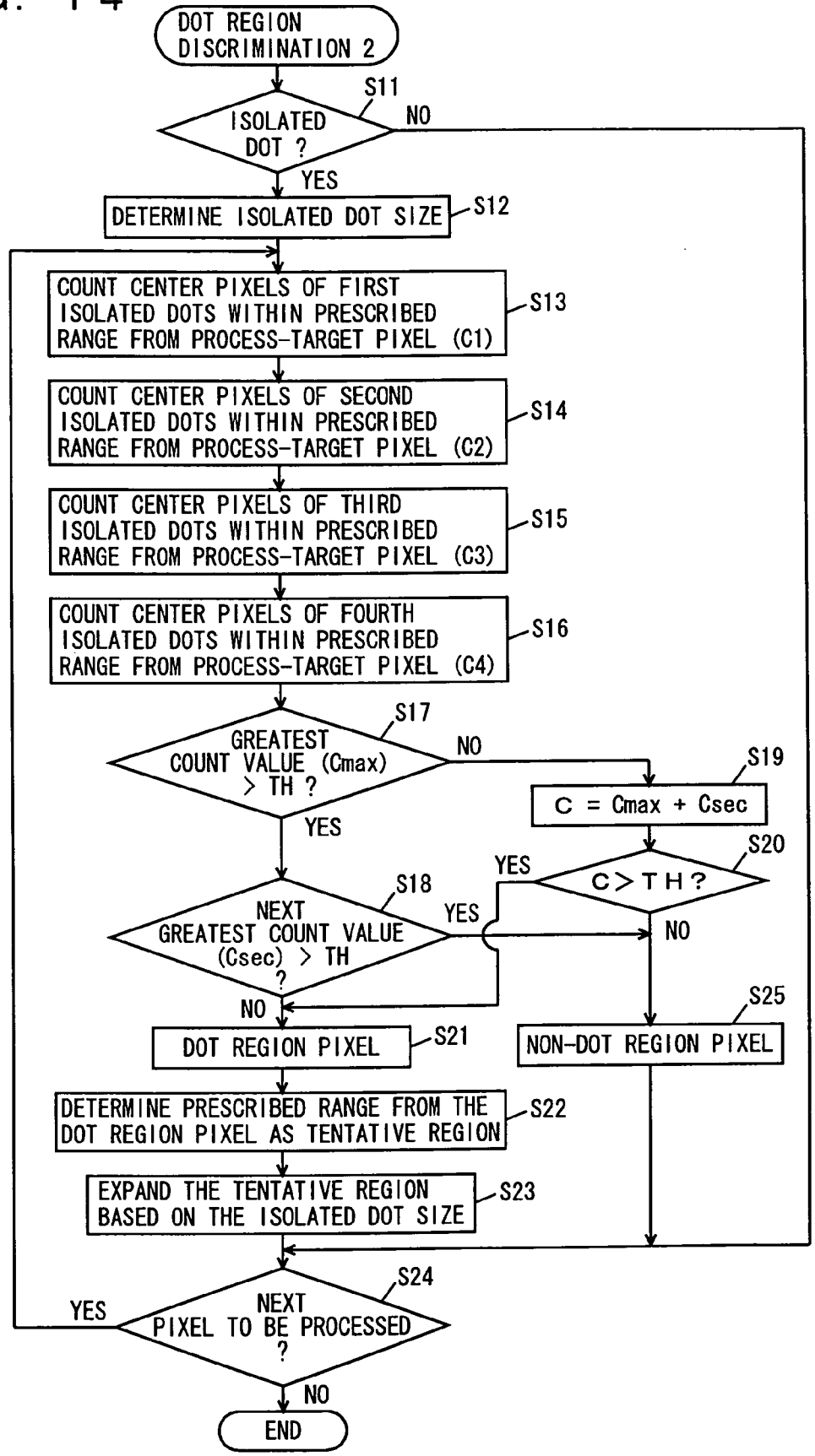
FIG. 14 is a flowchart illustrating a flow of a modified dot region discriminating process performed by the image processing apparatus of the second embodiment.

A modification of the dot region discriminating process is now described. FIG. 14 is a flowchart showing a flow of a modified dot region discriminating process that is performed by the image processing apparatus of the second embodiment. Steps S11 and S12 are identical to steps S01 and S02 in FIG. 13, and thus, description thereof is not repeated here.

In step S13, the number of center pixels of first isolated dots within a prescribed range from the process-target pixel is counted. The counted number of center pixels is set as a count value C1. The prescribed range is a rectangular region of 25 pixels in row and 25 pixels in column, centered on the process-target pixel, as described in the first embodiment. The first isolated dot refers to an isolated dot having the isolated dot size of one pixel.

In step S14, the number of center pixels of second isolated dots within a prescribed range from the process-target pixel is counted, and it is set as a count value C2. The prescribed range is the same as in step S13. The second isolated dot refers to an isolated dot having the isolated dot size of two pixels.

In step S15, the number of center pixels of third isolated dots within a prescribed range from the process-target pixel is counted, and it is set as a count value C3. The prescribed range is the same as in step S13. The third isolated dot refers to an isolated dot having the isolated dot size of three pixels.

In step S16, the number of center pixels of fourth isolated dots within a prescribed range from the process-target pixel is counted, and it is set as a count value C4. The prescribed range is the same as in step S13. The fourth isolated dot refers to an isolated dot having the isolated dot size of four pixels.

In step S17, it is determined whether a greatest count value Cmax among count values C1-C4 exceeds a threshold value TH. If so, process proceeds to step S18. If not, process proceeds to step S19. In step S18, it is determined whether the next greatest count value Csec exceeds threshold value TH. If so, process proceeds to step S25. If not, process proceeds to step S21.

In step S19, a sum C of greatest count value Cmax and next greatest count value Csec is calculated. In step S20, it is determined whether sum C exceeds threshold value TH or not. If so, process proceeds to step S21. If not, process proceeds to step S25.

In step S21, the process-target pixel is determined as a dot region pixel. In step S25, the process-target pixel is determined as a non-dot region pixel.

The process proceeds to step S21 in the following cases.

(1) When greatest count value Cmax exceeds threshold value TH and next greatest count value Csec does not exceed threshold value TH.

(2) When greatest count value Cmax does not exceed threshold value TH, but sum C exceeds threshold value TH. This applies to the case where the image data includes isolated dots having the isolated dot size of greater than one pixel and smaller than two pixels, for example. In such a case, a greater isolated dot size is used in the succeeding step S23.

The process proceeds to step S25 in the following cases.

(1) When greatest count value Cmax is not greater than threshold value TH and sum C is also not greater than threshold value TH. Since there is no count value exceeding threshold value TH, the process-target pixel is determined as not being included in a dot region.

(2) When greatest count value Cmax exceeds threshold value TH, and next greatest count value Csec also exceeds threshold value TH. This is for the purpose of preventing the event that the dot region is incorrectly determined by noise when the image data being processed include the isolated dots of the same size.

The processes in steps S22-S24 are identical to the processes in steps S06-S08 in FIG. 13, and thus, description thereof is not repeated here.

It may be configured to perform only step S17 to determine whether the process-target pixel is a dot region pixel or a non-dot region pixel, without performing steps S18-S20.

Second Modification of Dot Region Discriminating Process

Figure 15:
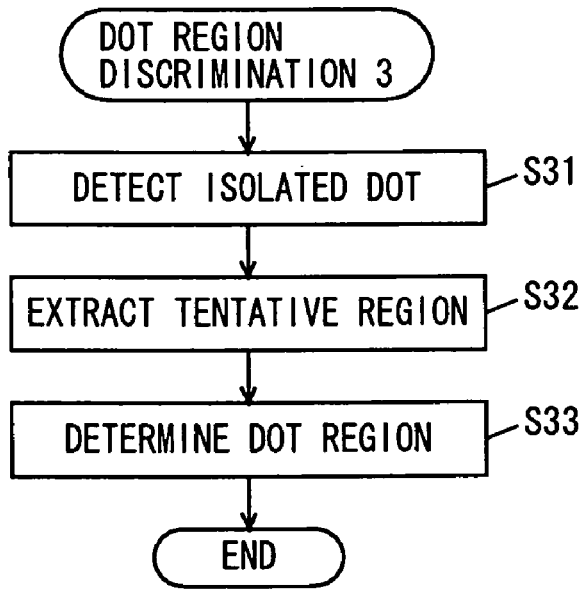
FIG. 15 shows a flow of another modified dot region discriminating process.

A second modification of the dot region discriminating process is now described. FIG. 15 shows a flow of the dot region discriminating process according to the second modification. Referring to FIG. 15, the dot region discriminating process includes the process of detecting center pixels of isolated dots form the image data (step S31), the process of extracting a tentative region based on the positions of the center pixels of the isolated dots detected (step S32), and the process of determining a dot region by correcting the tentative region in accordance with an isolated dot size (step S33).

Figure 16:
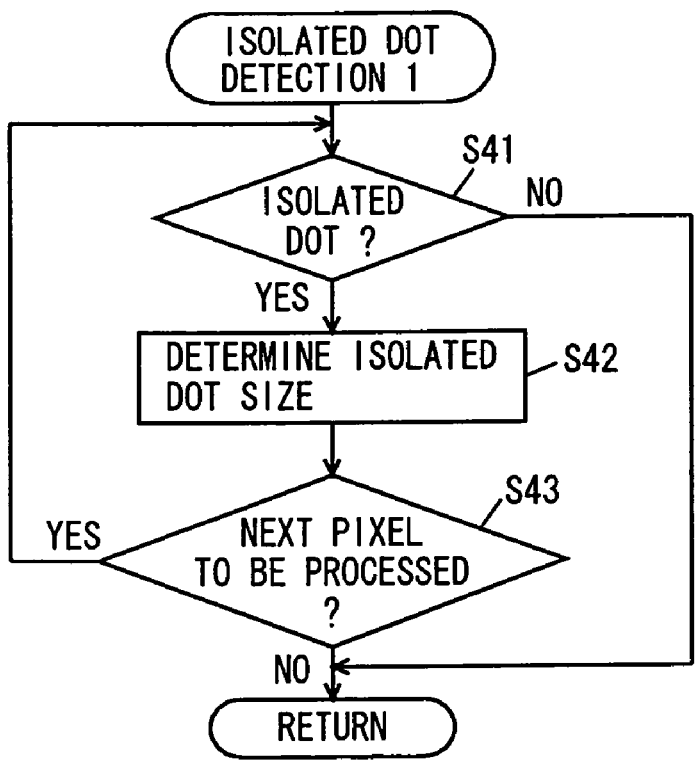
FIG. 16 is a flowchart illustrating a flow of an isolated dot detecting process performed in step S31 of FIG. 15.

FIG. 16 is a flowchart showing a flow of the isolated dot detecting process performed in step S31 of FIG. 15. Referring to FIG. 16, steps S41 and S42 are identical to steps S01 and S02 in FIG. 13, and thus, description thereof is not repeated here. In step S43, it is determined where there is another pixel to be processed. If so, process goes to step S41. If not, the process is completed. With this isolated dot detecting process, the processes in steps S41 and S42 are performed on every pixel in the image data. As such, for all the pixels in the image data, information as to whether they are center pixels of isolated dots or not, and if so, information of the isolated dot sizes are collected.

Figure 17:
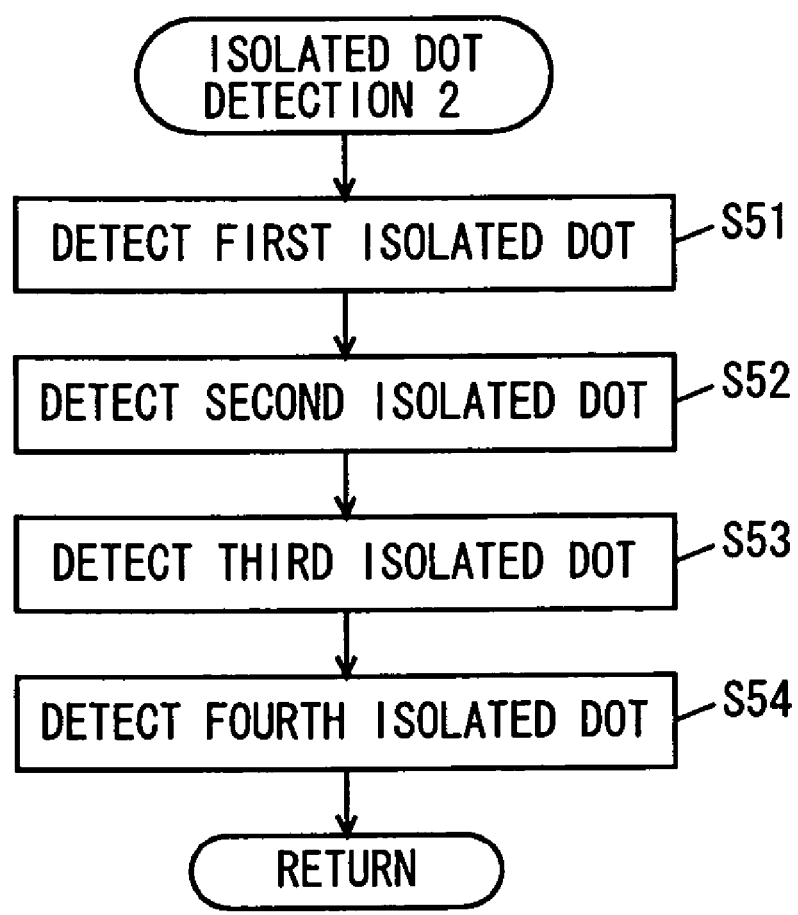
FIG. 17 is a flowchart illustrating another flow of the isolated dot detecting process performed in step S31 of FIG. 15.

FIG. 17 is a flowchart showing another flow of the isolated dot detecting process performed in step S31 of FIG. 15. Referring to FIG. 17, in step S51, the center pixels of the first isolated dots are detected from the image data. Specifically, the filter shown in FIG. 4A is used to calculate an evaluation value for the process-target pixel by the expression. (1) described above, and the process-target pixel is determined as a center pixel of the first isolated dot when the evaluation value satisfies the above-described isolated dot requisite condition 1. For each pixel in the image data, determination is made as to whether the pixel is a center pixel of the first isolated dot. As such, all the pixels determined as the center pixels of the first isolated dots within the image data are detected.

In step S52, the center pixels of the second isolated dots are detected from the image data. The filter shown in FIG. 4B is used to calculate an evaluation value for the process-target pixel by the expression (2) above, and the process-target pixel is determined as a center pixel of the second isolated dot when the evaluation value satisfies the isolated dot requisite condition 2. For each pixel in the image data, determination is made as to whether the pixel is a center pixel of the second isolated dot. As such, all the pixels determined as the center pixels of the second isolated dots within the image data are detected.

In step S53, the center pixels of the third isolated dots are detected from the image data. Specifically, the filter shown in FIG. 4C is used to calculate an evaluation value for the process-target pixel by the expression (3) above, and the process-target pixel is determined as a center pixel of the third isolated dot when the evaluation value satisfies the isolated dot requisite condition 3. For each pixel in the image data, determination is made as to whether the pixel is a center pixel of the third isolated dot. As such, all the pixels determined as the center pixels of the third isolated dots within the image data are detected.

In step S54, the center pixels of the fourth isolated dots are detected from the image data. The filter shown in FIG. 4D is used to calculate an evaluation value for the process-target pixel by the expression (4) above, and the process-target pixel is determined as a center pixel of the fourth isolated dot when the evaluation value satisfies the isolated dot requisite condition 4. For each pixel in the image data, determination is made as to whether the pixel is a center pixel of the fourth isolated dot. As such, all the pixels determined as the center pixels of the fourth isolated dots within the image data are detected.

Figure 18:
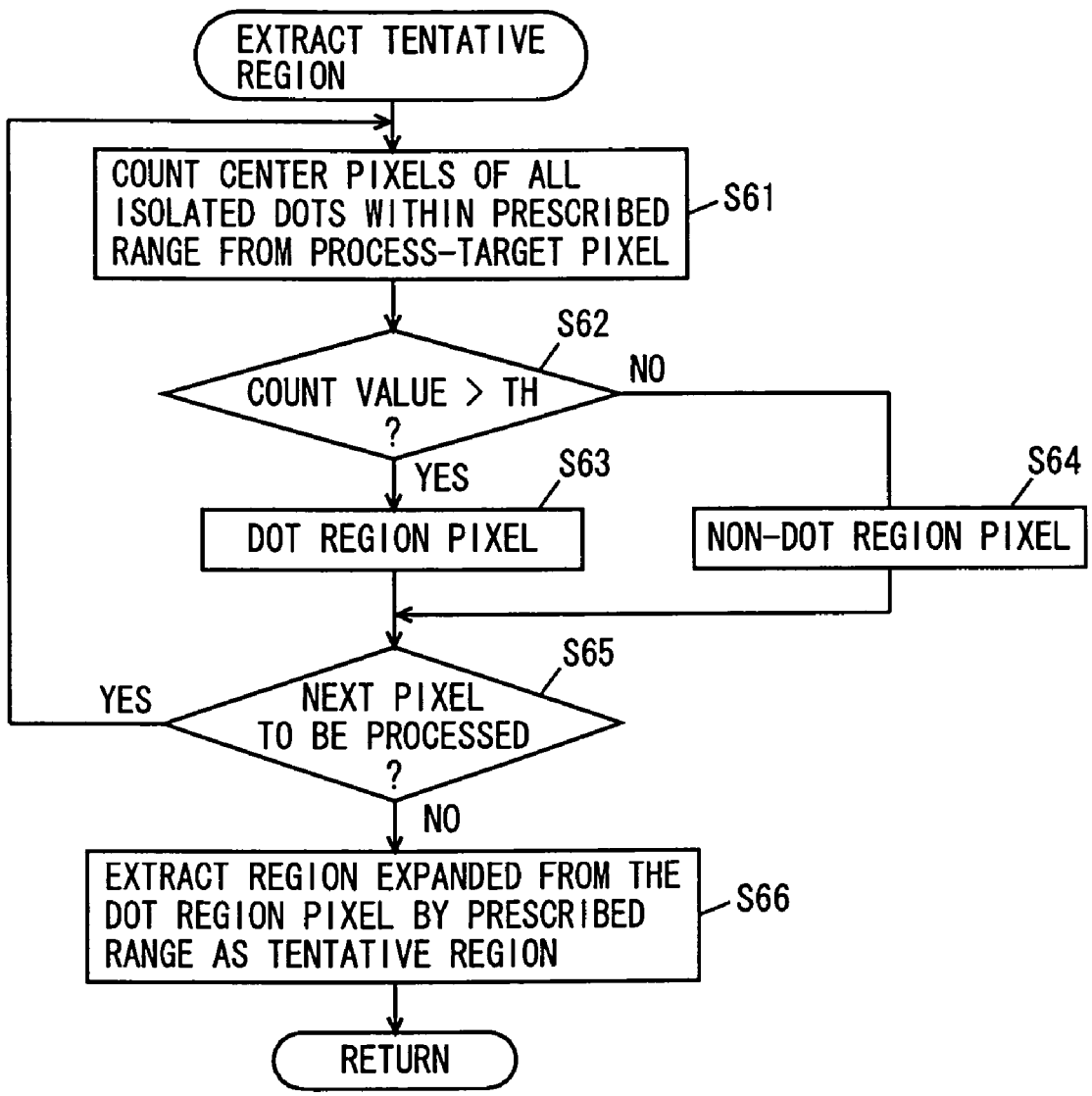
FIG. 18 is a flowchart illustrating a flow of a tentative region extracting process performed in step S32 of FIG. 15.

FIG. 18 is a flowchart showing a flow of the tentative region extracting process performed in step S32 of FIG. 15. Referring to FIG. 18, the processes in steps S61-64 are identical to the processes in steps S03-S05 and S09 in FIG. 13, except that in step S61, the number of the center pixels of the isolated dots detected in the modified isolated dot detecting process shown in FIG. 17 can be counted. Since the modified isolated dot detecting process detects the center pixels of the isolated dots for each isolated dot size, one pixel may be detected as the center pixels of the isolated dots of different isolated dot sizes. In step S61, such a pixel is counted more than one time.

In step S65, it is determined whether there is another pixel to be processed. If so, process returns to step S61, and the processes in steps S61-S64 are repeated. If it is determined that there is no more pixel to be processed, process proceeds to step S66. It means that the process goes to step S66 after every pixel in the image data has been determined as being a dot region pixel or a non-dot region pixel.

In step S66, a region expanded from a dot region pixel by a prescribed range is determined as a tentative region. The prescribed range is the same as that used for counting the center pixels of isolated dots in step S61. Here, it is a region of 25 pixels in row and 25 pixels in column centered on the process-target pixel.

It is noted that the processes in steps S61-S64 may be replaced with the processes in steps S13-S22 and S25 shown in FIG. 14. In this case, the modified isolated dot detecting process shown in FIG. 17 is performed in step S31 of FIG. 15.

It is also noted that the tentative region extracting process may be configured to extract a smallest rectangular region including all the center pixels of the isolated dots as the tentative region.

Figure 19:
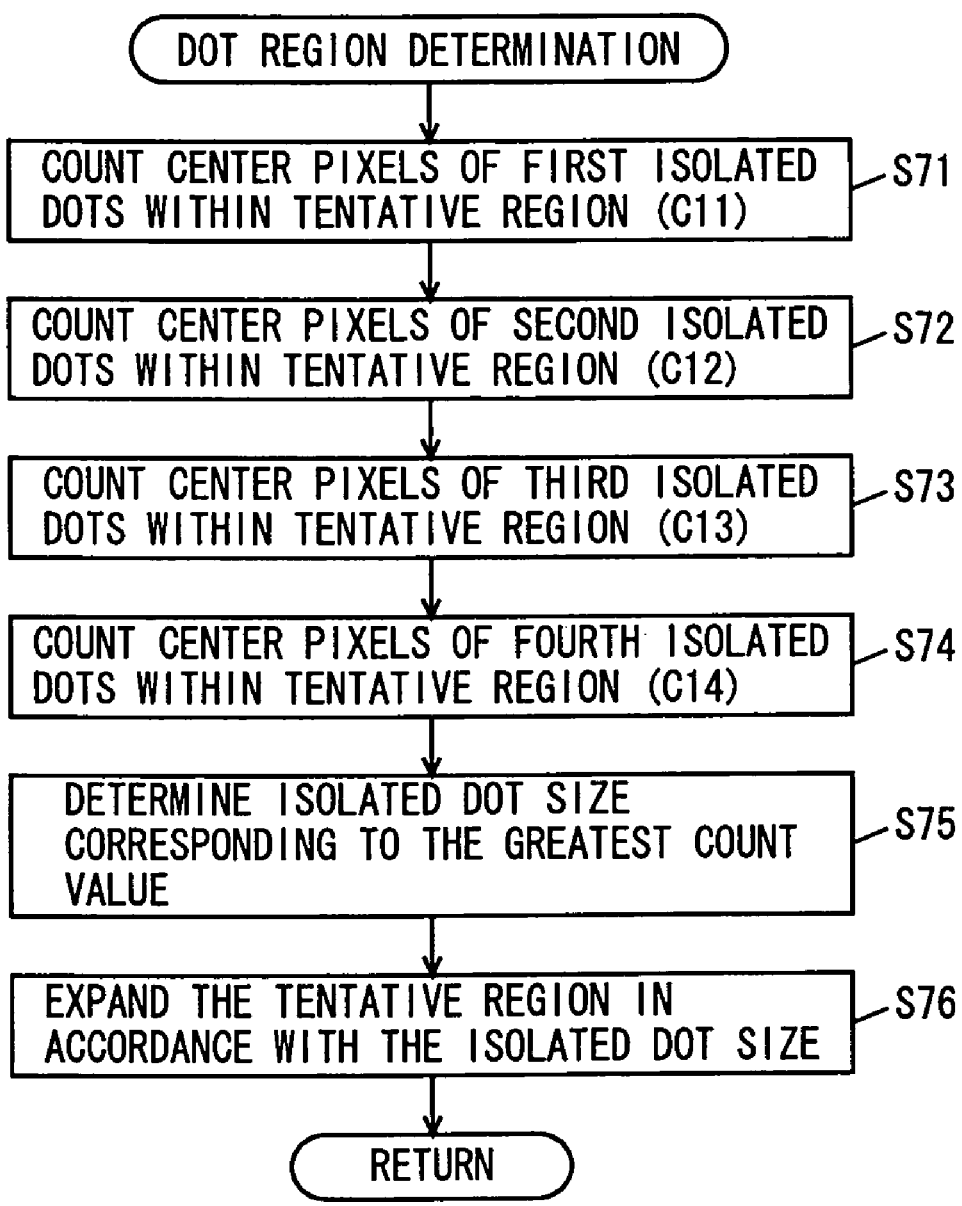
FIG. 19 is a flowchart illustrating a flow of a dot region determining process performed in step S33 of FIG. 15.

FIG. 19 is a flowchart showing a flow of the dot region determining process performed in step S33 of FIG. 15. Referring to FIG. 19, in the dot region determining process, the number of center pixels of first isolated dots within the tentative region extracted in the tentative region extracting process is counted (step S71), and it is set as a count value C11. The first isolated dot refers to an isolated dot having the isolated dot size of one pixel.

In step S72, the number of center pixels of second isolated dots within the tentative region extracted in the tentative region extracting process is counted, and it is set as a count value C12. The second isolated dot refers to an isolated dot having the isolated dot size of two pixels.

In step S73, the number of center pixels of third isolated dots within the tentative region extracted in the tentative region extracting process is counted, and it is set as a count value C13. The third isolated dot refers to an isolated dot having the isolated dot size of three pixels.

In step S74, the number of center pixels of fourth isolated dots within the tentative region extracted in the tentative region extracting process is counted, and it is set as a count value C14. The fourth isolated dot refers to an isolated dot having the isolated dot size of four pixels.

The isolated dot size corresponding to the greatest count value is then determined as an isolated dot size within the dot region (step S75). The tentative region is expanded in accordance with the isolated dot size determined in step S75 (step S76). The process in step S76 is identical to the process in step S07 of FIG. 13, and thus, description thereof is not repeated here.

In the dot region discriminating process according to the second modification, the numbers of the center pixels of the isolated dots included in the tentative region are counted separately for the different isolated dot sizes, and the isolated dot size corresponding to the greatest count value is selected as the isolated dot size. Accordingly, it is possible to accurately determine the dot region.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
   an isolated dot discriminating portion judging, for each pixel of a plurality of pixels included in an image, whether the pixel corresponds to a center pixel of an isolated dot;
   a size detector detecting an isolated dot size;
   a dot region discriminating portion judging whether a target pixel is included in a dot region based on a position of said pixel judged as being the center pixel of the isolated dot; and
   a dot region determining portion determining a dot region based on a position of said target pixel judged as being included in the dot region and said isolated dot size detected,
   wherein said dot region discriminating portion includes
   a counter counting the number of center pixels of isolated dots existing within a prescribed range from a process-target pixel, and
   a comparator comparing said counted number of the center pixels of the isolated dots with a predetermined threshold value.

2. The image processing apparatus according to claim 1, wherein said counter counts the number of the center pixels of the isolated dots of all sizes regardless of the isolated dot sizes.

3. The image processing apparatus according to claim 1, wherein
   said counter counts the number of the center pixels of the isolated dots separately for each isolated dot size, and
   said comparator compares the number of the center pixels of the isolated dots of the isolated dot size having been determined to exist in a greatest number with said threshold value.

4. The image processing apparatus according to claim 1, wherein
   said counter counts the number of the center pixels of the isolated dots separately for each isolated dot size, and
   said dot region discriminating portion judges that said process-target pixel is not included in a dot region when said comparator determines that the number of the center pixels of the isolated dots of the isolated dot size existing in a greatest number and the number of the center pixels of the isolated dots of the isolated dot size existing in a next greatest number both exceed said threshold value.

5. The image processing apparatus according to claim 1, wherein
   said counter counts the number of the center pixels of the isolated dots separately for each isolated dot size, and
   said dot region discriminating portion judges that said process-target pixel is included in a dot region when a sum of the number of the center pixels of the isolated dots of a first isolated dot size existing in a greatest number and the number of the center pixels of the isolated dots of a second isolated dot size different from said first isolated dot size exceeds said threshold value even if the number of the center pixels of the isolated dots of said first isolated dot size does not exceed said threshold value.

6. The image processing apparatus according to claim 1, wherein said dot region determining portion includes
- a tentative region determining portion determining a region within said prescribed range as a tentative region based on positions of the pixels judged as being included in the dot region, and
- a correcting portion correcting said determined tentative region based on said detected isolated dot size.

7. The image processing apparatus according to claim 6, wherein said correcting portion includes an expanding portion expanding said tentative region by the number of pixels of not greater than half said detected isolated dot size.

8. The image processing apparatus according to claim 1, wherein said isolated dot discriminating portion includes
- a plurality of calculators, each using a filter having sensitivity corresponding to an isolated dot size different from each other to calculate an evaluation value corresponding to the relevant isolated dot size for each process-target pixel, and
- a comparator comparing evaluation values calculated by said plurality of calculators with prescribed threshold values.

9. The image processing apparatus according to claim 1, further comprising a processor performing prescribed processing on the image, said processor changing a level of said prescribed processing to be performed on said determined dot region in accordance with said detected isolated dot size.

10. The image processing apparatus according to claim 9, wherein said prescribed processing is smoothing.

11. The image processing apparatus according to claim 9, wherein said prescribed processing is edge enhancement.

12. The image processing apparatus according to claim 9, wherein said level includes a level where no processing is performed.

13. An image processing apparatus comprising:
- an isolated dot discriminating portion judging, for each pixel of a plurality of pixels included in an image, whether the pixel corresponds to a center pixel of an isolated dot;
- a size detector detecting an isolated dot size;
- a dot region discriminating portion judging whether a target pixel is included in a dot region based on a position of said pixel judged as being the center pixel of the isolated dot; and
- a dot region determining portion determining a dot region based on a position of said target pixel judged as being included in the dot region and said isolated dot size detected, wherein said dot region discriminating portion judges that a process-target pixel is included in a dot region when said process-target pixel is included in a smallest rectangular region including center pixels of isolated dots, and said dot region determining portion determines the dot region to include said process-target pixel and peripheral pixels within a range of the number of pixels of not greater than half said detected isolated dot size from said process-target pixel.

* * * * *